United States Patent
Skupin et al.

(10) Patent No.: US 11,758,132 B2
(45) Date of Patent: Sep. 12, 2023

(54) ENCODER AND DECODER, ENCODING METHOD AND DECODING METHOD WITH COMPLEXITY HANDLING FOR FLEXIBLY SIZED PICTURE PARTITIONS

(71) Applicant: Fraunhofer-Gesellschaft zur Foerderung der angewandten Forschung e.V., Munich (DE)

(72) Inventors: Robert Philipp Skupin, Einsteinufer (DE); Yago Sánchez De La Fuente, Einsteinufer (DE); Cornelius Hellge, Einsteinufer (DE); Thomas Schierl, Einsteinufer (DE); Karsten Sühring, Einsteinufer (DE); Thomas Wiegand, Einsteinufer (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/777,180

(22) Filed: Jan. 30, 2020

(65) Prior Publication Data

US 2021/0006783 A1    Jan. 7, 2021

(30) Foreign Application Priority Data

Dec. 28, 2018    (EP) ...................... 8248303

(51) Int. Cl.
*H04N 19/119*    (2014.01)
*H04N 19/105*    (2014.01)
(Continued)

(52) U.S. Cl.
CPC ......... *H04N 19/119* (2014.11); *H04N 19/105* (2014.11); *H04N 19/156* (2014.11); *H04N 19/172* (2014.11); *H04N 19/176* (2014.11)

(58) Field of Classification Search
CPC .. H04N 19/119; H04N 19/105; H04N 19/156; H04N 19/172; H04N 19/176; H04N 19/436; H04N 19/52; H04N 19/70
See application file for complete search history.

(56) References Cited

U.S. PATENT DOCUMENTS 10,313,682 B2    6/2019   Pang
2015/0016505 A1   1/2015   Sjoberg et al.
(Continued)

FOREIGN PATENT DOCUMENTS

AU   2017203354 B2   6/2017
JP   2016-534649     11/2016
WO   WO 2016/208241  3/2016

OTHER PUBLICATIONS

Fuldseth A: "Replacing slices with tiles for high level parallelism", 4. JCT-VC Meeting; 95. MPEG Meeting, Jan. 2011, No. JCTVC-D227, XP030008267, Jan. 2011.
(Continued)

*Primary Examiner* — Nasim N Nirjhar
(74) *Attorney, Agent, or Firm* — NIXON & VANDERHYE P.C.

(57) ABSTRACT

A video encoder according to embodiments is provided. The video encoder is configured for encoding a plurality of pictures of a video by generating an encoded video signal, wherein each of the plurality of pictures has original picture data. The video encoder has a data encoder configured for generating the encoded video signal having encoded picture data, wherein the data encoder is configured to encode the plurality of pictures of the video into the encoded picture data. Moreover, the video encoder has an output interface configured for outputting the encoded picture data of each of the plurality of pictures. Furthermore, a video decoders, systems, methods for encoding and decoding, computer
(Continued)

programs and encoded video signals according to embodiments are provided.

6 Claims, 14 Drawing Sheets

(51) Int. Cl.
*H04N 19/156* (2014.01)
*H04N 19/172* (2014.01)
*H04N 19/176* (2014.01)

(56) References Cited

U.S. PATENT DOCUMENTS

| | | | |
|---|---|---|---|
| 2016/0050424 A1* | 2/2016 | Choi | H04N 19/172 |
| | | | 375/240.12 |
| 2018/0176603 A1 | 6/2018 | Fujimoto | |
| 2019/0325615 A1* | 10/2019 | Park | H04N 19/573 |
| 2019/0387239 A1* | 12/2019 | Wang | H04N 19/52 |
| 2020/0177911 A1* | 6/2020 | Aono | H04N 19/563 |
| 2021/0160533 A1* | 5/2021 | Zhang | H04N 19/176 |

OTHER PUBLICATIONS

Skupin R. et al.: "AHG12: On tiles with partial CTUs", 13. JVET Meeting, Jan. 2019, Marrakech, No. JVET-M0459, XP030201803, Jan. 2019.

Yasugi Y. et al.: "AHG12: Flexible tile partitioning", 12. JVET Meeting 2018, Macao, No. JVET-L0359, Oct. 11, 2018, XP030195385, Oct. 2018.

ITU-T, Series H: Audiovisual and Multimedia Systems, Infrastructure of audiovisual services—Coding of moving video—High efficiency video coding. ITU-T Recommendation H.265, Apr. 2013, 2013.

ITU-T, Series H: Audiovisual and Multimedia Systems, Infrastructure of audiovisual services—Coding of moving video—High efficiency video coding. ITU-T Recommendation H.265, Oct. 2014, 2014.

IN First Examination Report dated Apr. 8, 2022 in IN Application 202137029334.

Japanese office action dated Sep. 6, 2022, in Japanese patent application 2021-538095.

* cited by examiner

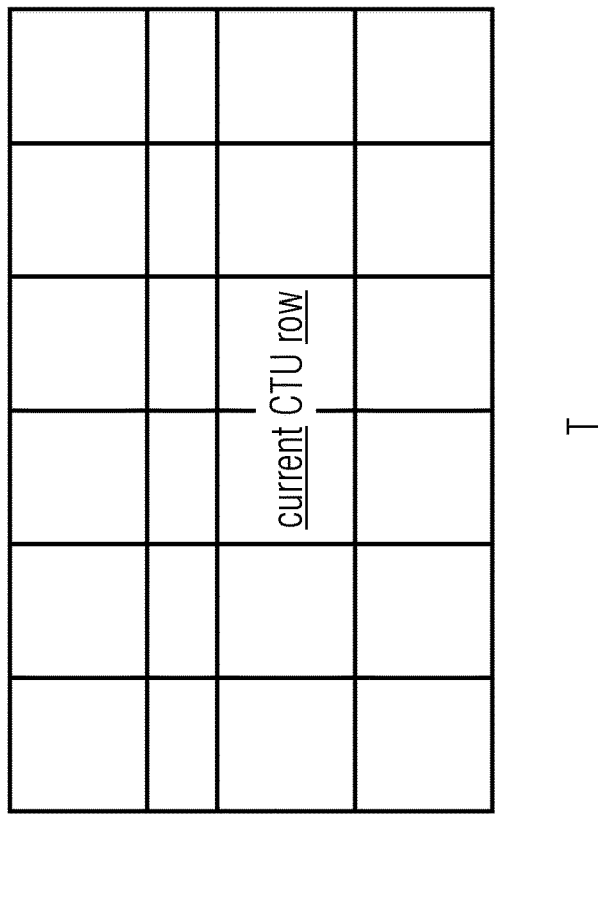
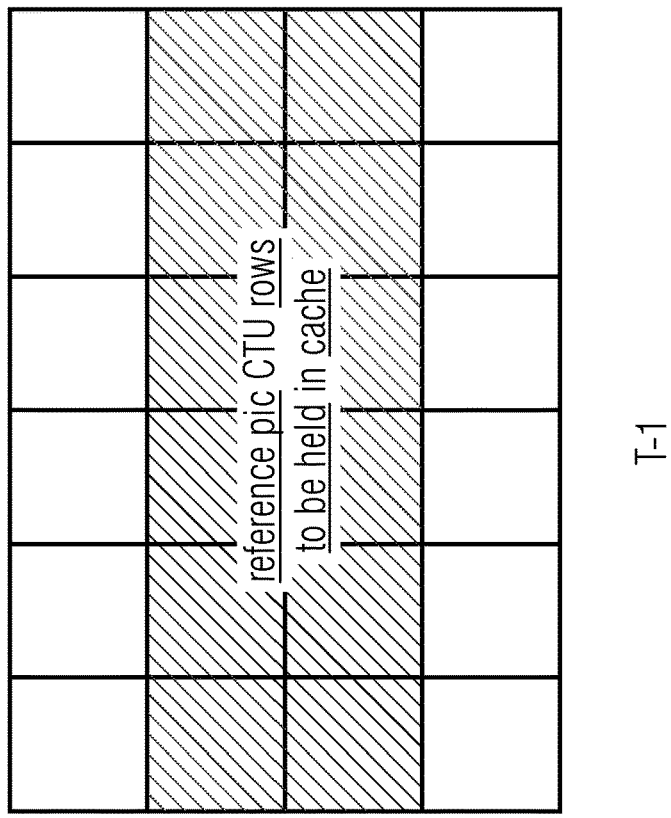
Fig. 9

ENCODER AND DECODER, ENCODING METHOD AND DECODING METHOD WITH COMPLEXITY HANDLING FOR FLEXIBLY SIZED PICTURE PARTITIONS

CROSS-REFERENCE TO RELATED APPLICATIONS

This application claims priority from European Application No. 18248303.2, which was filed on Dec. 28, 2018, and is incorporated herein by reference in its entirety.

BACKGROUND OF THE INVENTION

The present invention relates to video encoding and video decoding and, in particular, to an encoder and a decoder, to an encoding method and to a decoding method with complexity handling for flexibly sized picture data.

H.265/HEVC (HEVC=High Efficiency Video Coding) is a video codec which already provides tools for elevating or even enabling parallel processing at an encoder and/or at a decoder. For example, HEVC supports a sub-division of pictures into an array of tiles which are encoded independently from each other. Another concept supported by HEVC pertains to WPP, according to which CTU-rows or CTU-lines of the pictures may be processed in parallel from left to right, e.g. in stripes, provided that some minimum CTU offset is obeyed in the processing of consecutive CTU lines (CTU=coding tree unit). It would be favorable, however, to have a video codec at hand which supports parallel processing capabilities of video encoders and/or video decoders even more efficiently.

In the following, an introduction to VCL partitioning according to the state-of-the-art is described (VCL=video coding layer).

Typically, in video coding, a coding process of picture samples uses smaller partitions, where samples are divided into some rectangular areas for joint processing such as prediction or transform coding. Therefore, a picture is partitioned into blocks of a particular size that is constant during encoding of the video sequence. In H.264/AVC standard fixed-size blocks of 16×16 samples, so called macroblocks, are used (AVC=Advanced Video Coding).

In the state-of-the-art HEVC standard (see [1]), there are Coded Tree Blocks (CTB) or Coding Tree Units (CTU) of a maximum size of 64×64 samples. In the further description of HEVC, for such a kind of blocks, the more common term CTU is used. CTUs are processed in raster scan order, starting with the top-left CTU, processing CTUs in the picture line-wise, down to the bottom-right CTU.

The coded CTU data is organized into a kind of container called slice. Originally, in former video coding standards, slice means a segment comprising one or more consecutive CTUs of a picture. Slices are employed for a segmentation of coded data. From another point of view, the complete picture can also be defined as one big segment and hence, historically, the term slice is still applied. Besides the coded picture samples, slices also comprise additional information related to the coding process of the slice itself which is placed into a so-called slice header.

According to the state-of-the-art, a VCL (video coding layer) also comprises techniques for fragmentation and spatial partitioning. Such partitioning may, e.g., be applied in video coding for various reasons, among which are processing load-balancing in parallelization, CTU size matching in network transmission, error-mitigation etc.

SUMMARY

According to an embodiment, a video encoder for encoding a plurality of pictures of a video by generating an encoded video signal, wherein each of the plurality of pictures has original picture data, may have: a data encoder configured for generating the encoded video signal having encoded picture data, wherein the data encoder is configured to encode the plurality of pictures of the video into the encoded picture data, and an output interface configured for outputting the encoded picture data of each of the plurality of pictures, wherein, for each picture of the plurality of pictures, the data encoder is configured to partition the picture into a plurality of tiles having a plurality of coding tree units of the picture, wherein each coding tree unit of the plurality of coding tree units has a plurality of samples of the picture, wherein, for each picture of the plurality of pictures, the data encoder is configured to encode the original picture data of each of the plurality of tiles of the picture, wherein the data encoder is configured to generate the encoded video signal such that the encoded video signal further has a first flag that indicates for a current picture of the plurality of pictures, whether a reference picture of the plurality of pictures being different from the current picture has been used for encoding the current picture.

According to another embodiment, a video decoder for decoding an encoded video signal having encoded picture data to reconstruct a plurality of pictures of a video may have: an input interface configured for receiving the encoded video signal, and a data decoder configured for reconstructing the plurality of pictures of the video by decoding the encoded picture data, wherein, for each picture of the plurality of pictures, the picture is partitioned into a plurality of tiles having a plurality of coding tree units of the picture, wherein each coding tree unit of the plurality of coding tree units has a plurality of samples of the picture, wherein the encoded video signal further has a first flag that indicates for a current picture of the plurality of pictures, whether a reference picture of the plurality of pictures being different from the current picture has been used for encoding the current picture, wherein, for a picture of the plurality of pictures, the data decoder is configured to decode the encoded picture data of each of the plurality of tiles of the picture depending on the first flag to obtain original picture data of the plurality of coding tree units of each of the plurality of pictures.

According to another embodiment, a method for encoding a plurality of pictures of a video by generating an encoded video signal, wherein each of the plurality of pictures has original picture data, may have the steps of: generating the encoded video signal having encoded picture data, wherein the data encoder is configured to encode the plurality of pictures of the video into the encoded picture data, and outputting the encoded picture data of each of the plurality of pictures, wherein the method may further have the step of: for each picture of the plurality of pictures, partitioning the picture into a plurality of tiles having a plurality of coding tree units of the picture, wherein each coding tree unit of the plurality of coding tree units has a plurality of samples of the picture, for each picture of the plurality of pictures, encoding the original picture data of each of the plurality of tiles of the picture, and wherein generating the encoded video signal is conducted such that the encoded video signal further has a first flag that indicates for a current picture of the plurality of pictures, whether a reference picture of the plurality of pictures being different from the current picture has been used for encoding the current picture.

According to still another embodiment, a method for decoding an encoded video signal having encoded picture data to reconstruct a plurality of pictures of a video may have the steps of: receiving the encoded video signal, and reconstructing the plurality of pictures of the video by decoding the encoded picture data, wherein, for each picture of the plurality of pictures, the picture is partitioned into a plurality of tiles having a plurality of coding tree units of the picture, wherein each coding tree unit of the plurality of coding tree units has a plurality of samples of the picture, wherein the encoded video signal further has a first flag that indicates for a current picture of the plurality of pictures, whether a reference picture of the plurality of pictures being different from the current picture has been used for encoding the current picture, wherein, for a picture of the plurality of pictures, decoding the encoded picture data of each of the plurality of tiles of the picture is conducted depending on the first flag to obtain original picture data of the plurality of coding tree units of each of the plurality of pictures.

Another embodiment may have a non-transitory digital storage medium having stored thereon a computer program for performing a method for encoding a plurality of pictures of a video by generating an encoded video signal, wherein each of the plurality of pictures has original picture data, wherein the method may have the steps of: generating the encoded video signal having encoded picture data, wherein the data encoder is configured to encode the plurality of pictures of the video into the encoded picture data, and outputting the encoded picture data of each of the plurality of pictures, wherein the method may further have the steps of: for each picture of the plurality of pictures, partitioning the picture into a plurality of tiles having a plurality of coding tree units of the picture, wherein each coding tree unit of the plurality of coding tree units has a plurality of samples of the picture, for each picture of the plurality of pictures, encoding the original picture data of each of the plurality of tiles of the picture, and wherein generating the encoded video signal is conducted such that the encoded video signal further has a first flag that indicates for a current picture of the plurality of pictures, whether a reference picture of the plurality of pictures being different from the current picture has been used for encoding the current picture, when said computer program is run by a computer.

Another embodiment may have a non-transitory digital storage medium having stored thereon a computer program for performing a method for decoding an encoded video signal having encoded picture data to reconstruct a plurality of pictures of a video, wherein the method may have the steps of: receiving the encoded video signal, and reconstructing the plurality of pictures of the video by decoding the encoded picture data, wherein, for each picture of the plurality of pictures, the picture is partitioned into a plurality of tiles having a plurality of coding tree units of the picture, wherein each coding tree unit of the plurality of coding tree units has a plurality of samples of the picture, wherein the encoded video signal further has a first flag that indicates for a current picture of the plurality of pictures, whether a reference picture of the plurality of pictures being different from the current picture has been used for encoding the current picture, wherein, for a picture of the plurality of pictures, decoding the encoded picture data of each of the plurality of tiles of the picture is conducted depending on the first flag to obtain original picture data of the plurality of coding tree units of each of the plurality of pictures, when said computer program is run by a computer.

Still another embodiment may have an encoded video signal encoding a picture, wherein the encoded video signal has encoded picture data encoding the picture, wherein, for each picture of the plurality of pictures, the picture is partitioned into a plurality of tiles having a plurality of coding tree units of the picture, wherein each coding tree unit of the plurality of coding tree units has a plurality of samples of the picture, wherein, for each picture of the plurality of pictures, the original picture data of each of the plurality of tiles of the picture is encoded within the encoded video signal, and wherein the encoded video signal further has a first flag that indicates for a current picture of the plurality of pictures, whether a reference picture of the plurality of pictures being different from the current picture has been used for encoding the current picture.

According to another embodiment, a system may have: the inventive video encoder as mentioned above, and the inventive video decoder as mentioned above, wherein the video encoder configured to generate the encoded video signal, and wherein the video decoder is configured to decode the encoded video signal to reconstruct the picture of the video.

BRIEF DESCRIPTION OF THE DRAWINGS

In the following, embodiments of the present invention are described in detail with reference to the figures, in which:

FIG. 9 illustrates corresponding CTU rows in reference picture after partial CTU in current picture;

DETAILED DESCRIPTION OF THE INVENTION

The following description of the figures starts with a presentation of a description of an encoder and a decoder of a block-based predictive codec for coding pictures of a video in order to form an example for a coding framework into which embodiments of the present invention may be built in. The respective encoder and decoder are described with respect to FIG. 10 to FIG. 12. Thereinafter the description of embodiments of the concept of the present invention is presented along with a description as to how such concepts could be built into the encoder and decoder of FIG. 10 and FIG. 11, respectively, although the embodiments described with FIG. 1 to FIG. 3 and following, may also be used to form encoders and decoders not operating according to the coding framework underlying the encoder and decoder of FIG. 10 and FIG. 11.

Figure 10:
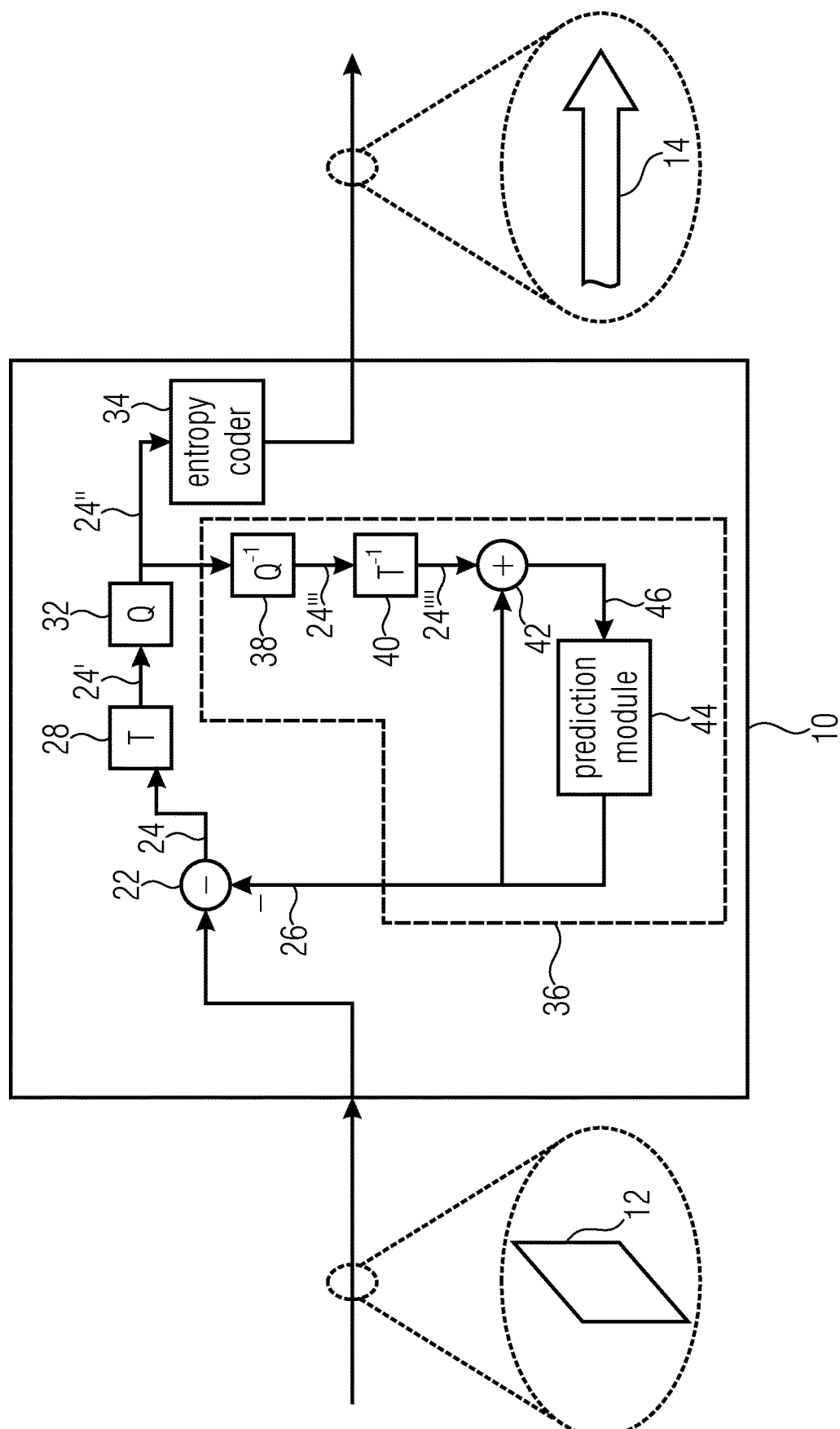
FIG. 10 illustrates a video encoder.
Figure 11:
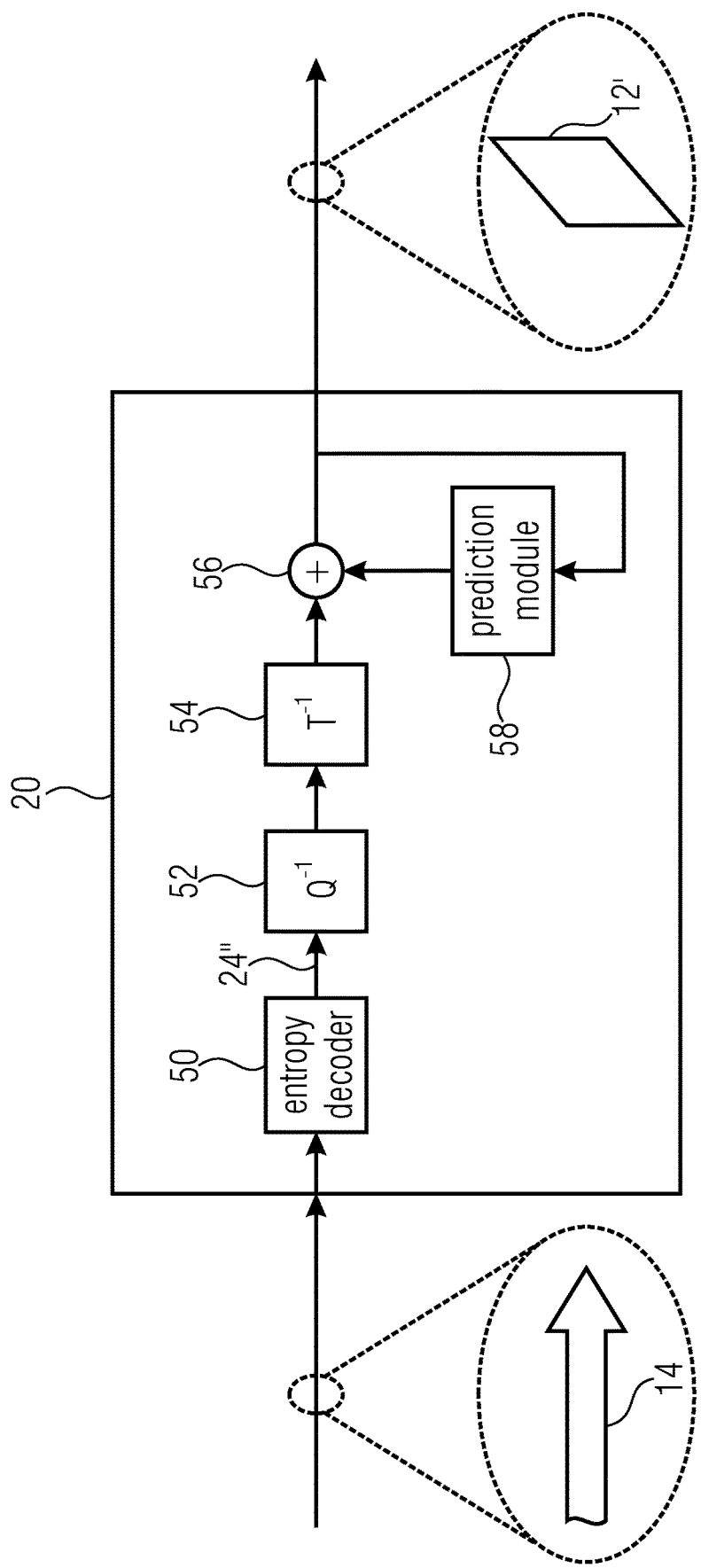
FIG. 11 illustrates a video decoder.

FIG. 10 shows a video encoder, an apparatus for predictively coding a picture 12 into a data stream 14 exemplarily using transform-based residual coding. The apparatus, or encoder, is indicated using reference sign 10. FIG. 11 shows a corresponding video decoder 20, i.e. an apparatus 20 configured to predictively decode the picture 12' from the data stream 14 also using transform-based residual decoding, wherein the apostrophe has been used to indicate that the picture 12' as reconstructed by the decoder 20 deviates from picture 12 originally encoded by apparatus 10 in terms of coding loss introduced by a quantization of the prediction residual signal. FIG. 10 and FIG. 11 exemplarily use transform based prediction residual coding, although embodiments of the present application are not restricted to this kind of prediction residual coding. This is true for other details described with respect to FIG. 10 and FIG. 11, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, i.e. from the picture 12. The prediction residual signal former 22 may, for instance, be a subtractor which subtracts the prediction signal from the original signal, i.e. from the picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by the encoder 10. The thus quantized prediction residual signal 24" is coded into bitstream 14. To this end, encoder 10 may optionally comprise an entropy coder 34 which entropy codes the prediction residual signal as transformed and quantized into data stream 14. The prediction signal 26 is generated by a prediction stage 36 of encoder 10 on the basis of the prediction residual signal 24" encoded into, and decodable from, data stream 14. To this end, the prediction stage 36 may internally, as is shown in FIG. 10, comprise a dequantizer 38 which dequantizes prediction residual signal 24" so as to gain spectral-domain prediction residual signal 24''', which corresponds to signal 24' except for quantization loss, followed by an inverse transformer 40 which subjects the latter prediction residual signal 24''' to an inverse transformation, i.e. a spectral-to-spatial transformation, to obtain prediction residual signal 24'''', which corresponds to the original prediction residual signal 24 except for quantization loss. A combiner 42 of the prediction stage 36 then recombines, such as by addition, the prediction signal 26 and the prediction residual signal 24'''' so as to obtain a reconstructed signal 46, i.e. a reconstruction of the original signal 12. Reconstructed signal 46 may correspond to signal 12'. A prediction module 44 of prediction stage 36 then generates the prediction signal 26 on the basis of signal 46 by using, for instance, spatial prediction, i.e. intra-picture prediction, and/or temporal prediction, i.e. inter-picture prediction.

Likewise, decoder 20, as shown in FIG. 11, may be internally composed of components corresponding to, and interconnected in a manner corresponding to, prediction stage 36. In particular, entropy decoder 50 of decoder 20 may entropy decode the quantized spectral-domain prediction residual signal 24" from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24" so that, as shown in FIG. 11, the output of combiner 56 results in the reconstructed signal, namely picture 12'.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost. For example, encoder 10 and decoder 20 and the corresponding modules 44, 58, respectively, may support different prediction modes such as intra-coding modes and inter-coding modes. The granularity at which encoder and decoder switch between these prediction mode types may correspond to a subdivision of picture 12 and 12', respectively, into coding segments or coding blocks. In units of these coding segments, for instance, the picture may be subdivided into blocks being intra-coded and blocks being inter-coded. Intra-coded blocks are predicted on the basis of a spatial, already coded/decoded neighborhood of the respective block as is outlined in more detail below. Several intra-coding modes may exist and be selected for a respective intra-coded segment including directional or angular intra-coding modes according to which the respective segment is filled by extrapolating the sample values of the neighborhood along a certain direction which is specific for the respective directional intra-coding mode, into the respective intra-coded segment. The intra-coding modes may, for instance, also comprise one or more further modes such as a DC coding mode, according to which the prediction for the respective intra-coded block assigns a DC value to all samples within the respective intra-coded segment, and/or a planar intra-coding mode according to which the prediction of the respective block is approximated or determined to be a spatial distribution of sample values described by a two-dimensional linear function over the sample positions of the respective intra-coded block with driving tilt and offset of the plane defined by the two-dimensional linear function on the basis of the neighboring samples. Compared thereto, inter-coded blocks may be predicted, for instance, temporally. For inter-coded blocks, motion vectors may be signaled within the data stream, the motion vectors indicating the spatial displacement of the portion of a previously coded picture of the video to which picture 12 belongs, at which the previously coded/decoded picture is sampled in order to obtain the prediction signal for the respective inter-coded block. This means, in addition to the residual signal coding comprised by data stream 14, such as the entropy-coded transform coefficient levels representing the quantized spectral-domain prediction residual signal 24", data stream 14 may have encoded thereinto coding mode parameters for assigning the coding modes to the various blocks, prediction parameters for some of the blocks, such as motion parameters for inter-coded segments, and optional further parameters such as parameters for controlling and signaling the subdivision of picture 12 and 12', respectively, into the segments. The decoder 20 uses these parameters to subdivide the picture in the same manner as the encoder did, to assign the same prediction modes to the segments, and to perform the same prediction to result in the same prediction signal.

Figure 12:
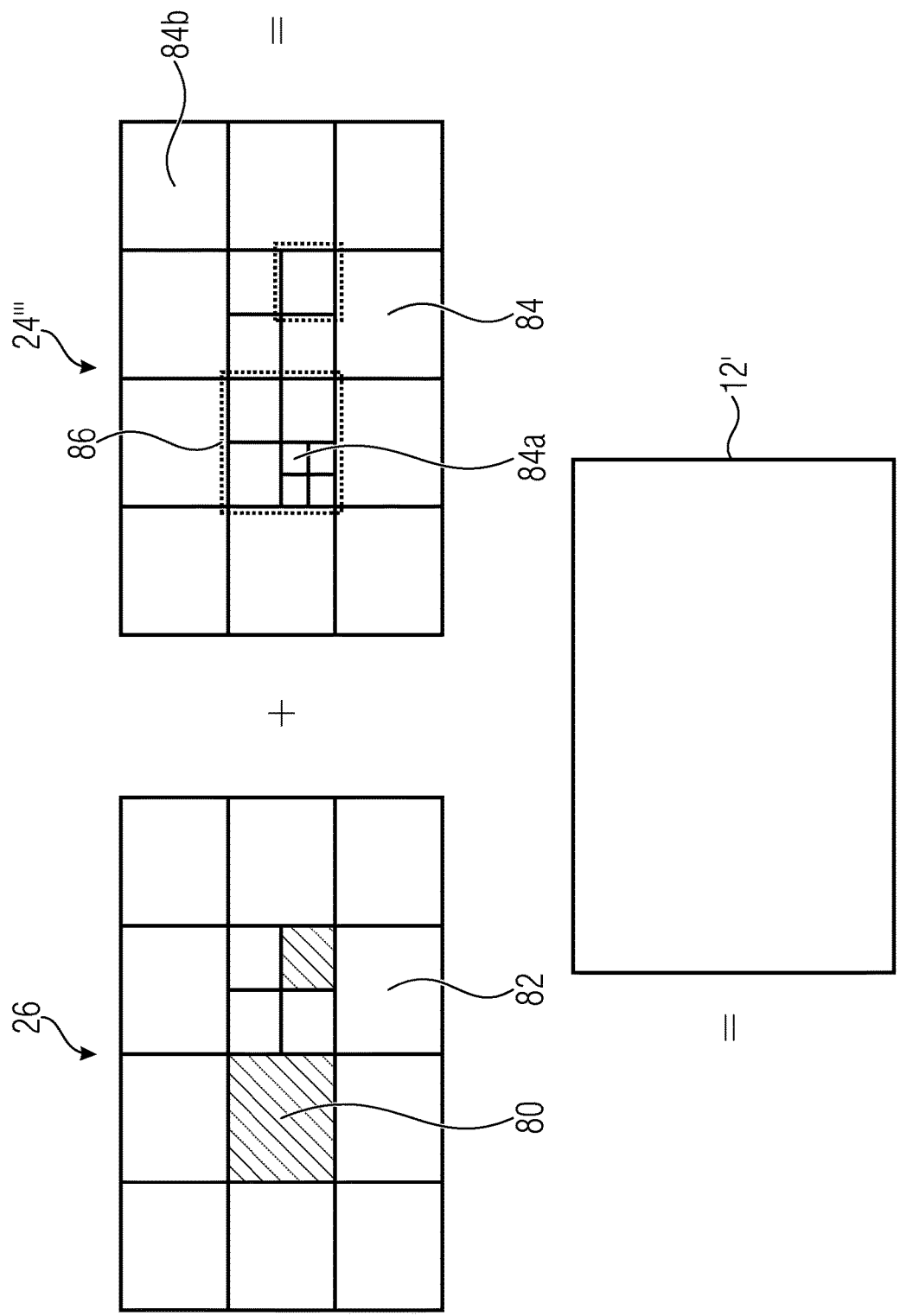
FIG. 12 illustrates the relationship between the reconstructed signal, i.e. the reconstructed picture, on the one hand, and the combination of the prediction residual signal as signaled in the data stream, and the prediction signal, on the other hand.

FIG. 12 illustrates the relationship between the reconstructed signal, i.e. the reconstructed picture 12', on the one hand, and the combination of the prediction residual signal 24'''' as signaled in the data stream 14, and the prediction signal 26, on the other hand. As already denoted above, the combination may be an addition. The prediction signal 26 is illustrated in FIG. 12 as a subdivision of the picture area into intra-coded blocks which are illustratively indicated using hatching, and inter-coded blocks which are illustratively indicated not-hatched. The subdivision may be any subdivision, such as a regular subdivision of the picture area into rows and columns of square blocks or non-square blocks, or a multi-tree subdivision of picture 12 from a tree root block into a plurality of leaf blocks of varying size, such as a quadtree subdivision or the like, wherein a mixture thereof is illustrated in FIG. 12 in which the picture area is first subdivided into rows and columns of tree root blocks which are then further subdivided in accordance with a recursive multi-tree subdivisioning into one or more leaf blocks.

Again, data stream 14 may have an intra-coding mode coded thereinto for intra-coded blocks 80, which assigns one of several supported intra-coding modes to the respective intra-coded block 80. For inter-coded blocks 82, the data stream 14 may have one or more motion parameters coded thereinto. Generally speaking, inter-coded blocks 82 are not restricted to being temporally coded. Alternatively, inter-coded blocks 82 may be any block predicted from previously coded portions beyond the current picture 12 itself, such as previously coded pictures of a video to which picture 12 belongs, or picture of another view or an hierarchically lower layer in the case of encoder and decoder being scalable encoders and decoders, respectively.

The prediction residual signal 24'''' in FIG. 12 is also illustrated as a subdivision of the picture area into blocks 84. These blocks might be called transform blocks in order to distinguish same from the coding blocks 80 and 82. In effect, FIG. 12 illustrates that encoder 10 and decoder 20 may use two different subdivisions of picture 12 and picture 12', respectively, into blocks, namely one subdivisioning into coding blocks 80 and 82, respectively, and another subdivision into transform blocks 84. Both subdivisions might be the same, i.e. each coding block 80 and 82, may concurrently form a transform block 84, but FIG. 12 illustrates the case where, for instance, a subdivision into transform blocks 84 forms an extension of the subdivision into coding blocks 80, 82 so that any border between two blocks of blocks 80 and 82 overlays a border between two blocks 84, or alternatively speaking each block 80, 82 either coincides with one of the transform blocks 84 or coincides with a cluster of transform blocks 84. However, the subdivisions may also be determined or selected independent from each other so that transform blocks 84 could alternatively cross block borders between blocks 80, 82. As far as the subdivision into transform blocks 84 is concerned, similar statements are thus true as those brought forward with respect to the subdivision into blocks 80, 82, i.e. the blocks 84 may be the result of a regular subdivision of picture area into blocks (with or without arrangement into rows and columns), the result of a recursive multi-tree subdivisioning of the picture area, or a combination thereof or any other sort of blockation. Just as an aside, it is noted that blocks 80, 82 and 84 are not restricted to being of quadratic, rectangular or any other shape.

FIG. 12 further illustrates that the combination of the prediction signal 26 and the prediction residual signal 24'''' directly results in the reconstructed signal 12'. However, it should be noted that more than one prediction signal 26 may be combined with the prediction residual signal 24'''' to result into picture 12' in accordance with alternative embodiments.

In FIG. 12, the transform blocks 84 shall have the following significance. Transformer 28 and inverse transformer 54 perform their transformations in units of these transform blocks 84. For instance, many codecs use some sort of DST or DCT for all transform blocks 84. Some codecs allow for skipping the transformation so that, for some of the transform blocks 84, the prediction residual signal is coded in the spatial domain directly.

However, in accordance with embodiments described below, encoder 10 and decoder 20 are configured in such a manner that they support several transforms. For example, the transforms supported by encoder 10 and decoder 20 could comprise:

DCT-II (or DCT-III), where DCT stands for Discrete Cosine Transform
DST-IV, where DST stands for Discrete Sine Transform
DCT-IV
DST-VII
Identity Transformation (IT)

Naturally, while transformer 28 would support all of the forward transform versions of these transforms, the decoder 20 or inverse transformer 54 would support the corresponding backward or inverse versions thereof:

Inverse DCT-II (or inverse DCT-III)
Inverse DST-IV
Inverse DCT-IV
Inverse DST-VII
Identity Transformation (IT)

The subsequent description provides more details on which transforms could be supported by encoder 10 and decoder 20. In any case, it should be noted that the set of supported transforms may comprise merely one transform such as one spectral-to-spatial or spatial-to-spectral transform.

As already outlined above, FIG. 10 to FIG. 12 have been presented as an example where the inventive concept described further below may be implemented in order to form specific examples for encoders and decoders according to the present application. Insofar, the encoder and decoder of FIG. 10 and FIG. 11, respectively, may represent possible implementations of the encoders and decoders described herein below. FIG. 10 and FIG. 11 are, however, only examples. An encoder according to embodiments of the present application may, however, perform block-based encoding of a picture 12 using the concept outlined in more detail below and being different from the encoder of FIG. 10 such as, for instance, in that same is no video encoder, but a still picture encoder, in that same does not support inter-prediction, or in that the sub-division into blocks 80 is performed in a manner different than exemplified in FIG. 12. Likewise, decoders according to embodiments of the present application may perform block-based decoding of picture 12' from data stream 14 using the coding concept further outlined below, but may differ, for instance, from the decoder 20 of FIG. 11 in that same is no video decoder, but a still picture decoder, in that same does not support intra-prediction, or in that same sub-divides picture 12' into blocks in a manner different than described with respect to FIG. 12 and/or in that same does not derive the prediction residual from the data stream 14 in transform domain, but in spatial domain, for instance.

Picture partitioning with slices is now briefly described.

Beginning with the H.263 standard, the sequence of data representing contiguous blocks in a particular scan order can be organized into groups called slices. Typically, the dependencies between CTUs of different slices of a picture, e.g. in terms of prediction and entropy coding, are prohibited, so individual slices within a picture can be independently reconstructed.

Figure 13:
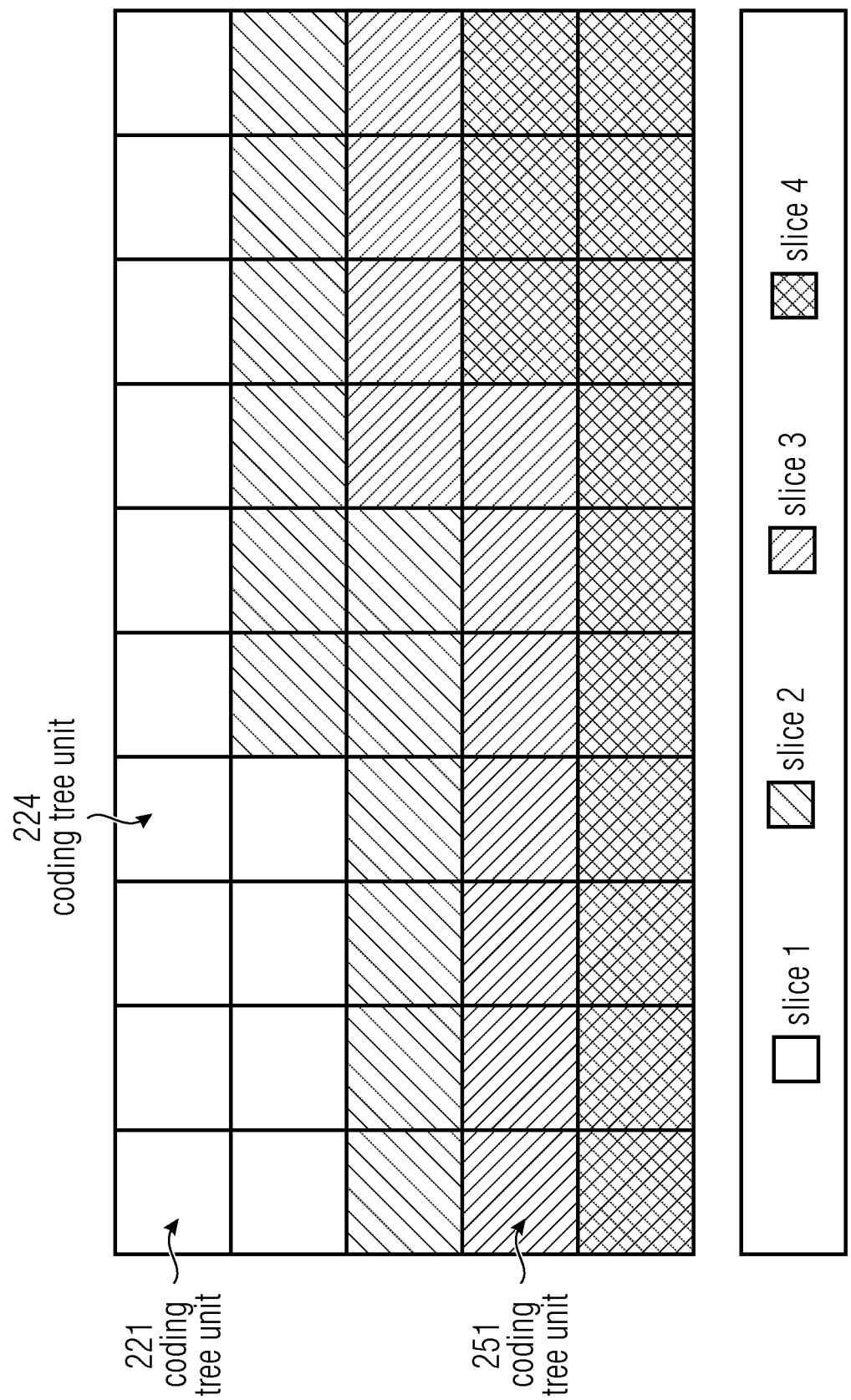
FIG. 13 illustrates picture segmentation with slices in raster scan order.

FIG. 13 illustrates picture segmentation with slices in raster scan order. The size of a slice is determined by the number of CTUs (coding tree units) and the size of each coded CTU that belongs to a slice as illustrated in FIG. 13. FIG. 13 comprises 50 CTUs, for example, CTU 221, CTU 224 and CTU 251.

Figure 14:
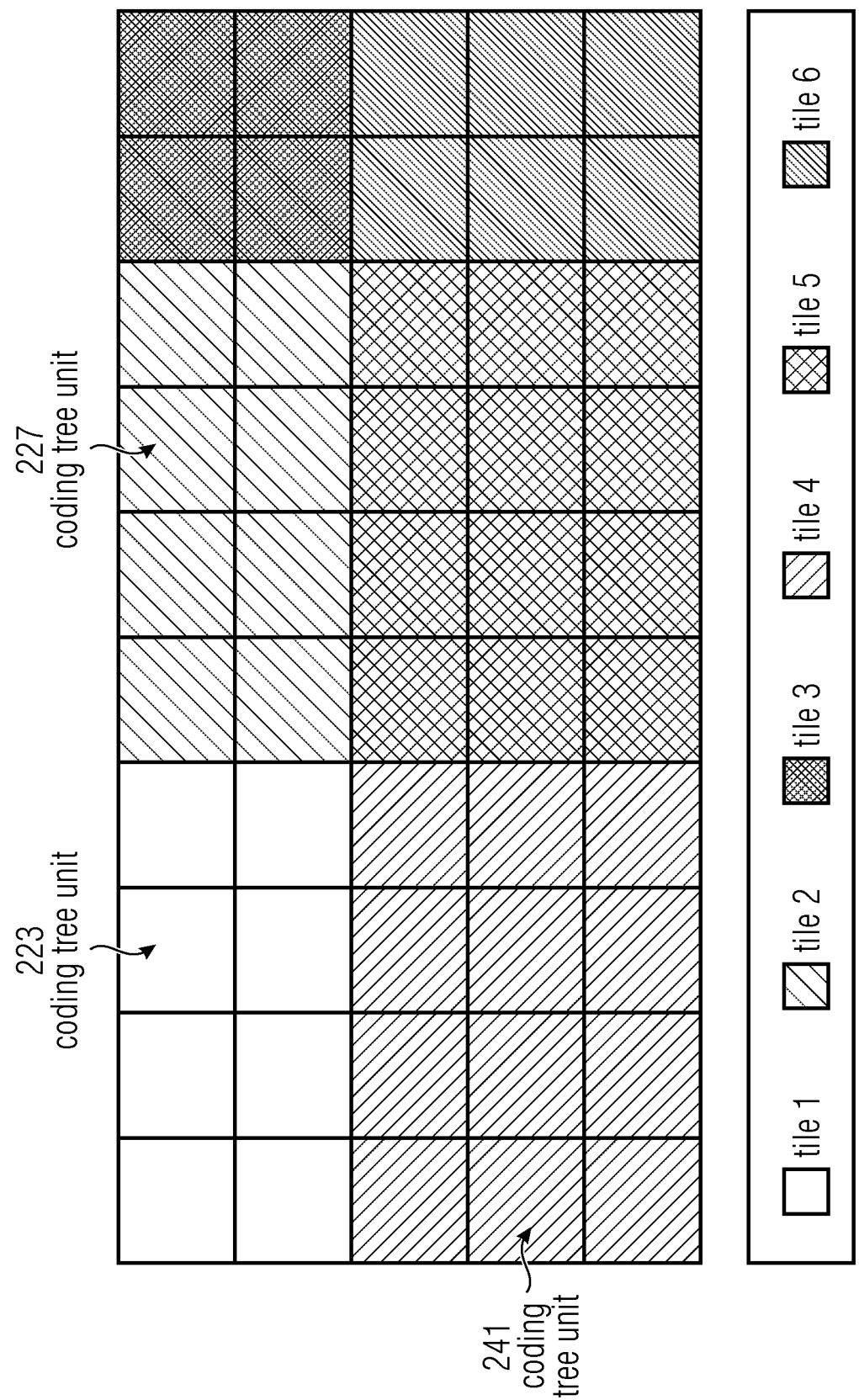
FIG. 14 illustrates picture partitioning with tiles.

Picture partitioning with tiles is now briefly described with reference to FIG. 14. FIG. 14 comprises 50 CTUs, for example, CTU 223, CTU 227 and CTU 241.

Tiles are a concept introduced in HEVC, although the concept is a quite similar to Flexible Macroblock Ordering (FMO) was added to H.264/AVC. The concept of tiles allows dividing the picture into several rectangular regions.

Tiles are thus a result of dividing the original picture into a given number of rows and columns with a specified height and width respectively as illustrated in FIG. 14. As a result of that, tiles within an HEVC bitstream are to have common boundaries that form a regular grid.

In the following, a generic video encoder according to embodiments is described in FIG. 1, a generic video decoder according to embodiments is described in FIG. 2, and a generic system according to embodiments is described in FIG. 3.

Figure 1:
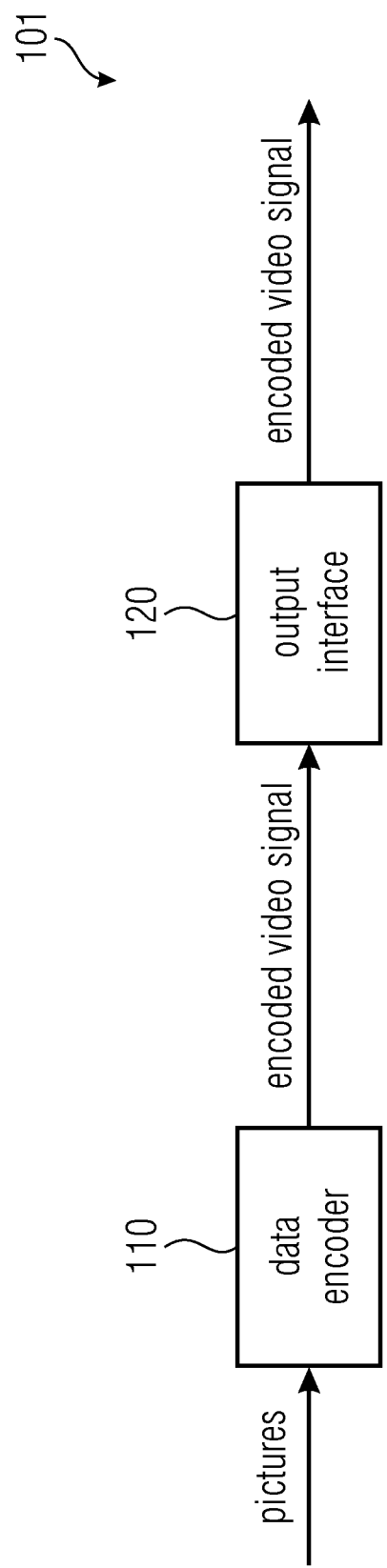
FIG. 1 illustrates a video encoder according to an embodiment.

FIG. 1 illustrates a generic video encoder 101 according to embodiments.

The video encoder 101 is configured for encoding a plurality of pictures of a video by generating an encoded video signal, wherein each of the plurality of pictures comprises original picture data.

The video encoder 101 comprises a data encoder 110 configured for generating the encoded video signal comprising encoded picture data, wherein the data encoder is configured to encode the plurality of pictures of the video into the encoded picture data.

Moreover, the video encoder 101 comprises an output interface 120 configured for outputting the encoded picture data of each of the plurality of pictures.

Figure 2:
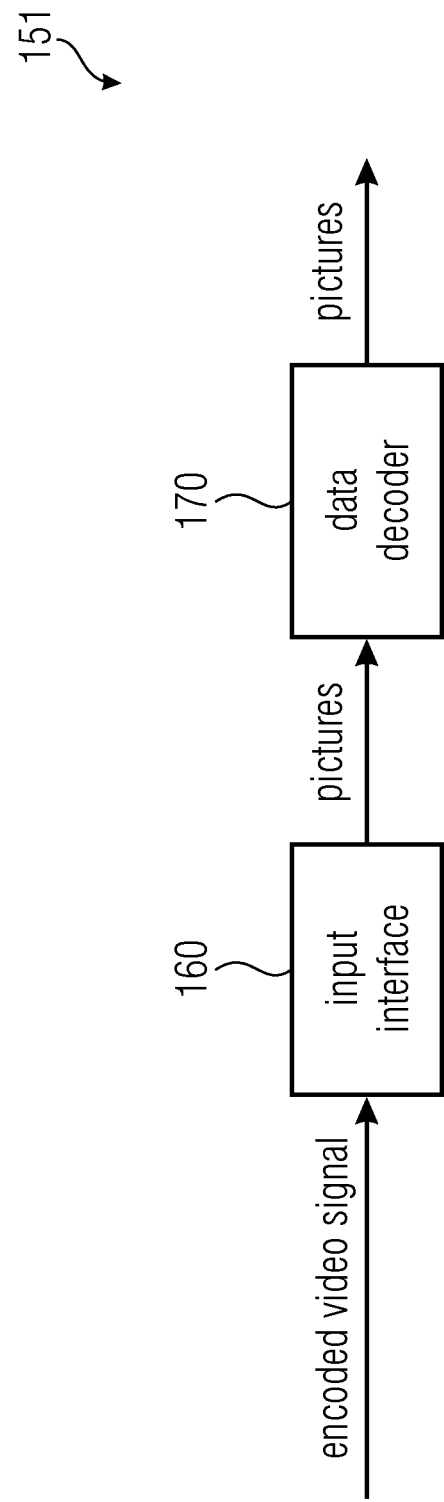
FIG. 2 illustrates a video decoder according to an embodiment.

FIG. 2 illustrates a generic video decoder 151 according to embodiments.

The video decoder 151 is configured for decoding an encoded video signal comprising encoded picture data to reconstruct a plurality of pictures of a video.

The video decoder 151 comprises an input interface 160 configured for receiving the encoded video signal.

Moreover, the video decoder comprises a data decoder 170 configured for reconstructing the plurality of pictures of the video by decoding the encoded picture data.

Figure 3:
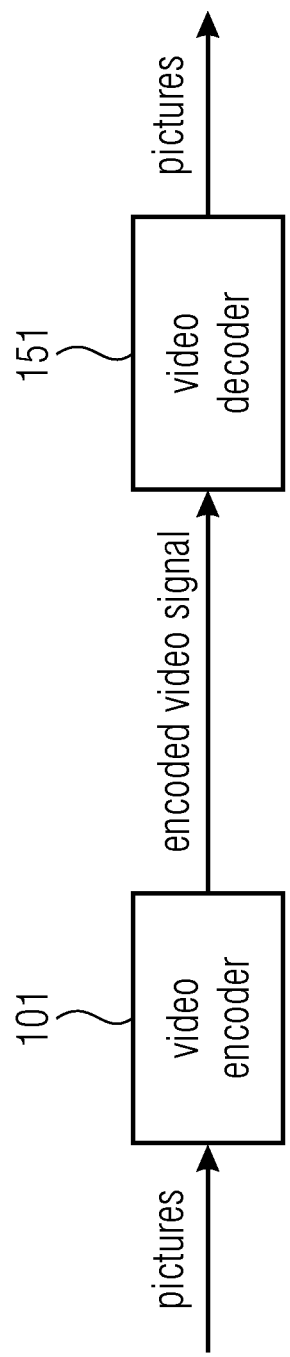
FIG. 3 illustrates a system according to an embodiment.

FIG. 3 illustrates a generic system according to embodiments.

The system comprises the video encoder 101 of FIG. 1 and the video decoder 151 of FIG. 2.

The video encoder 101 is configured to generate the encoded video signal. The video decoder 151 is configured to decode the encoded video signal to reconstruct the picture of the video.

A first aspect is provided in examples 1 to 5, in examples 45 to 49 and in examples 89 to 93.

A second aspect is provided in examples 6 to 13, in examples 50 to 57 and in examples 94 to 98.

A third aspect is provided in examples 14 to 18, in examples 58 to 62 and in examples 99 to 103.

A fourth aspect is provided in examples 19 to 22, in examples 63 to 66 and in examples 104 to 108.

A fifth aspect is provided in examples 24 to 27, in examples 68 to 71 and in examples 109 to 113.

A sixth aspect is provided in examples 28 to 32, in examples 72 to 76 and in examples 114 to 118.

A seventh aspect is provided in examples 33 and 34, in examples 77 and 78 and in examples 119 to 123.

An eighth aspect is provided in examples 35 to 38, in examples 79 to 82 and in examples 124 to 128.

A ninth aspect is provided in examples 40 to 44, in examples 84 to 88 and in examples 129 to 133.

Examples 23, 39, 67 and 83 relate to particular examples that may, for example, be employed for different aspects.

In the following, details of complexity handling for flexibly sized picture partitions according to embodiments are described.

Tiles have been specified in HEVC as a subdivision mechanism for the picture. They are defined in the picture parameter set (PPS), where their dimensions are given. Tiles, as defined for now have a size which is multiple of CTUs (typically 64 samples) and only the last tiles, i.e. tiles at the right or bottom border, of a picture are allowed to have their CTUs at the right and bottom picture boundaries being smaller than 64.

However, such a restriction prevents a couple of use-cases:

MCTS bitstream merging: the bitstreams to be merged together within a single bitstream need to be a multiple of the size chose for the CTU, as original picture boundaries might not be picture boundaries in the merged bitstream.

Proper load balancing, where tiles adjust to the content not necessarily at multiples of a predefined size (the CTU size)

In addition, the current video coding specification developed by JVET—Versatile Video Coding—allows larger values of CTUs (up to 128), which makes it even more crucial to allow for tiles that are not multiple of CTUs. Defining partial CTUs based on whether the desired functionality is used, would be possible but would affect the coding efficiency for such cases. Still, it is desirable to allow tiles to not comprise a complete number of CTUs of a determined size but to allow the rightmost CTUs and CTUs on the bottom boundary of a tiles to be smaller.

However, when such a functionality is allowed, different aspects affect the decoding process.

In the following, controlling the complexity of partial in-picture CTUs is described.

In particular, the first aspect of the invention is now described in detail:

Currently, that all CTUs are the same size, processors are optimized to decode the structures of the predefined size. Allowing that variable size might impose a complexity increase for a decoder. Especially, since the number of CTUs can change from picture to picture.

The first aspect of the current invention is that when such variable sized CTUs are allowed within each tile, a constraint need to be fulfilled that keeps the number of variable sized CTUs constant from picture to picture.

In the first aspect, a constraint is applied.

Figure 4:
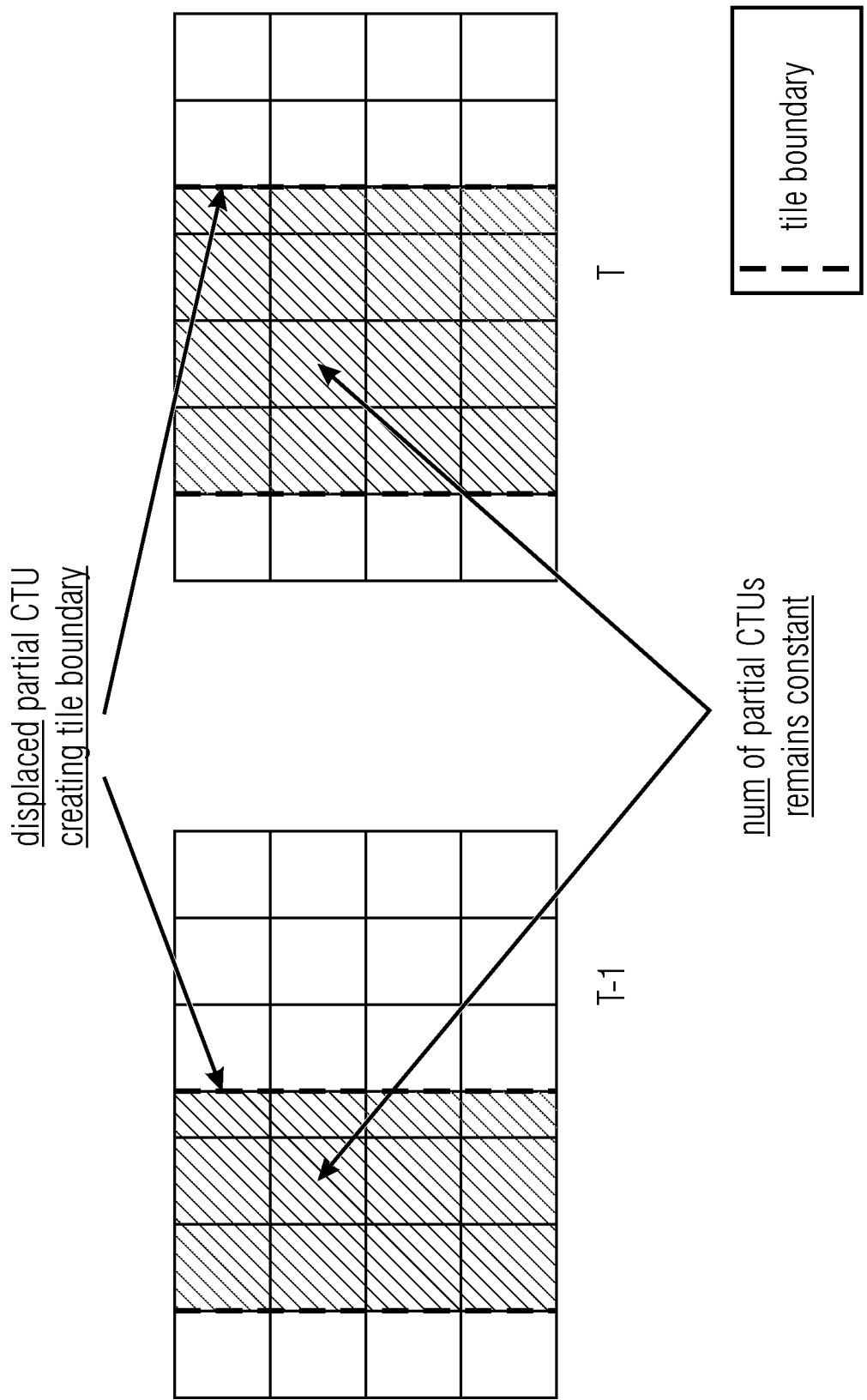
FIG. 4 illustrates CTUs affected by displacing a partial CTU creating tile boundary.

FIG. 4 illustrates CTUs affected by displacing a partial CTU creating tile boundary.

If tiles sizes are not multiple of the predefined CTU size, hence variable sized CTUs smaller than the predefined CTU size are introduced, it is a requirement of bitstream conformance to have the same number of such variable sized CTUs in each of the pictures as illustrated in FIG. 4.

Additionally, this property can be signaled to a decoder using a flag in a parameter set that indicates num_partial_ctus_constant_flag.

The second aspect of the invention is now described in detail:

The second aspect differentiates partial CTUs creating tile boundaries from regular tile boundaries in their complexity impact. When decoder checks level limitations for maximum amount of decoded pels per time unit, it adds a complexity factor for partial CTUs. For example, the partial CTU could be counted with 1.5 times it's actual size, or with the number of pels of the predetermined CTU size as if it were not to be limited in size to be a variable sized CTU by a tile boundary. This means that picture size limits could be affected by the presence of partial CTUs. For instance, if all CTUs are of the same size a picture limit for a decoder can be 4096×2160 at 50 frames per second, but if 5×4 tiles where defined and all would have partial CTUs at the right and bottom boundaries, i.e. 20 partial CTUs, then the limit could be 4056×2128 at the same frame rate.

Figure 5:
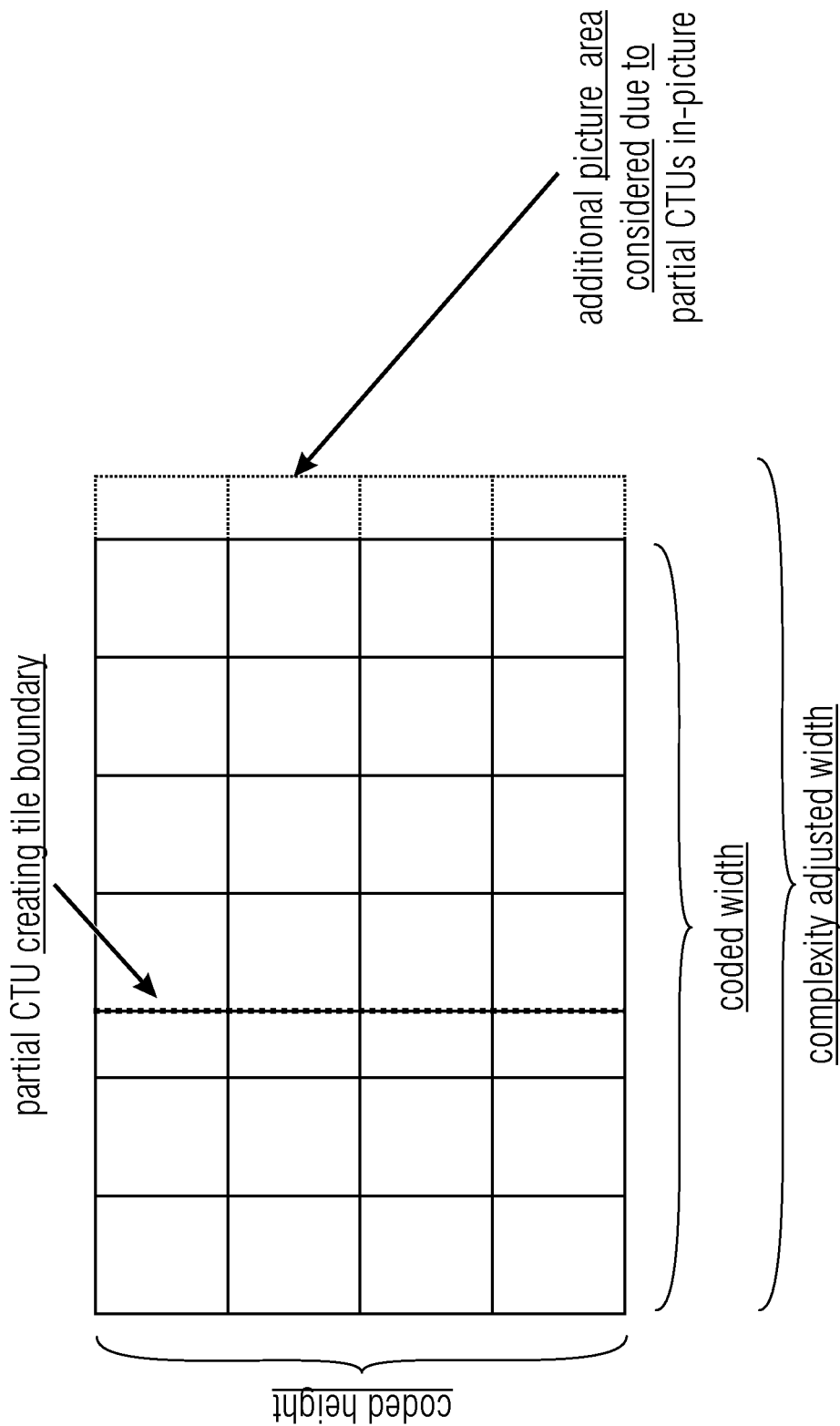
FIG. 5 illustrates luma sample per picture compensation from partial CTUs.

FIG. 5 illustrates luma sample per picture compensation from partial CTUs. In particular, the complexity adjusted picture area is illustrated in FIG. 5.

Furthermore, a lower limit to the size of variable sized CTUs is imposed to regard the granularity with which motion vector or displacement information of reference pictures is stored in the coding process, e.g. with a 16×16 samples granularity, as opposed to allow arbitrarily small variable CTUs with a size between 1 sample and a predefined CTU size in any direction. A variable sized CTU is not allowed to be smaller than a predetermined minimal CTU size to be indicated or derived, e.g. from the motion vector storage granularity so that no two CTUs lie within the scope of the same motion vector storage unit.

The third aspect of the invention is now described in detail:

In such another independent third aspect, the presence of partial CTUs is taken into account for the complexity signaling of tiles. For instance, HEVC comprises the parameters min_spatial_segmentation_idc in VUI that describe the complexity of spatial segments including tiles. Currently, when applied to tiles it implies that "there is no tile in the CVS (coded video sequence) that comprises more than (4*PicSizeInSamplesY)/(min_spatial_segmentation_idc+4) luma samples". In addition, as part of the invention, the complexity signaling limits for tiles to not comprise more than a given number of partial CTUs depending on the maximum tile size and/or relationship between the default CTU size and the size of partial CTUs. Alternatively, an additional parameter is signaled in VUI indicating the relative amount of partial CTUs allowed in a picture.

In the following, embodiments are described where CTU boundaries can change from picture to picture.

In particular, the fourth aspect of the invention is now described in detail:

If tiles might have their right/bottom boundaries end at smaller granularity than the pre-defined CTU size, and following tiles start with CTUs at pre-defined size, when the tiles setup changes from picture to picture, CTU alignment across pictures will not be achieved, which might be detrimental for some predictive coding, such as using temporal motion vector prediction. Memory management could be more difficult and therefore, it would be desirable to limit the flexibility of generating CTU boundary misalignment from picture to picture.

The fourth aspect would be to constrain that any tile boundary, that creates partial CTUs, can only be moved to a location, at which it creates partial CTUs at same split ratio at a different picture within the same video sequence. This allows for having aligned CTUs in areas not covered by the range from initial last CTU position and modified last CTU position as illustrated FIG. 6.

Figure 6:
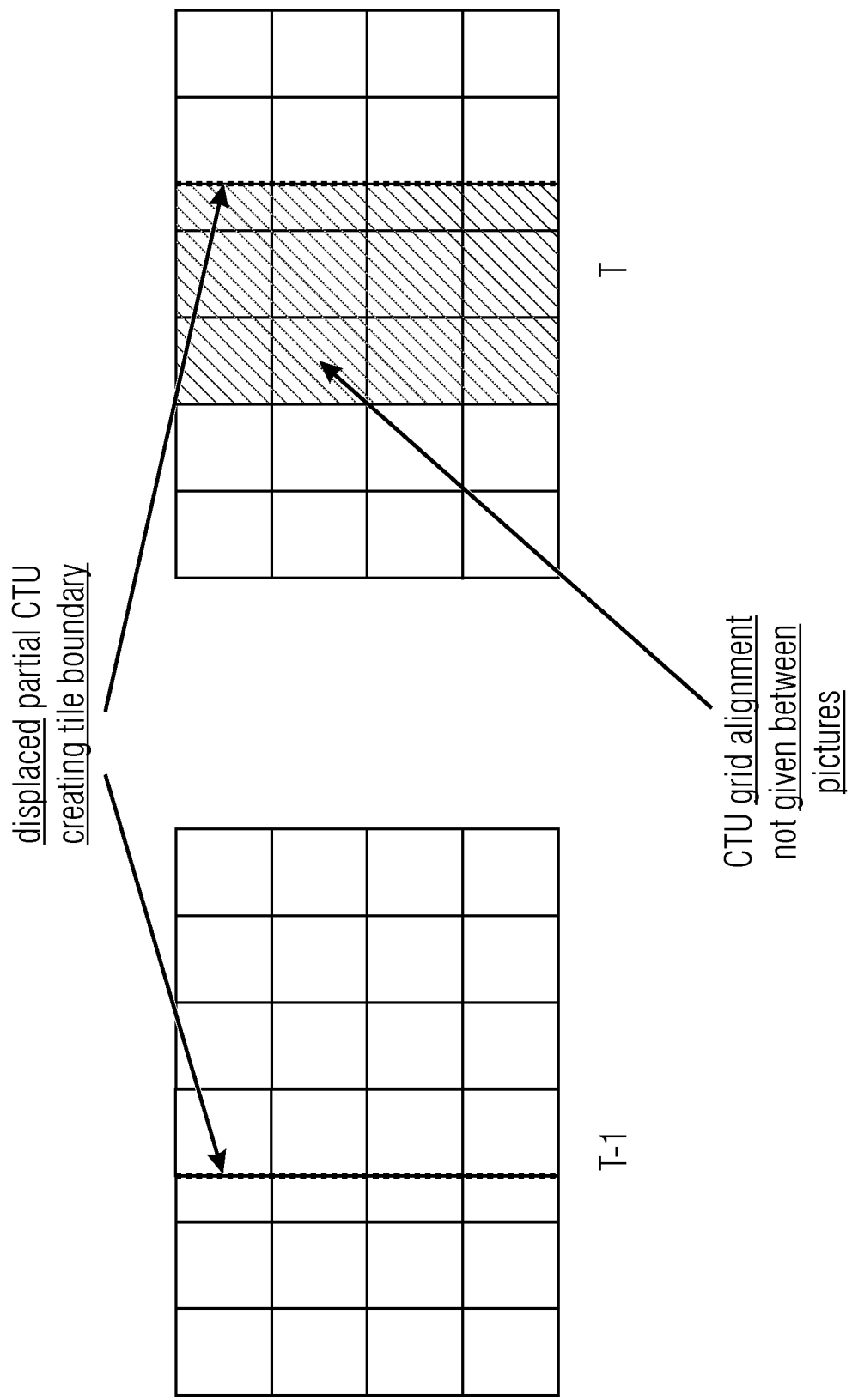
FIG. 6 illustrates CTU grid alignment mismatches.

FIG. 6 illustrates CTU grid alignment mismatches.

Figure 7:
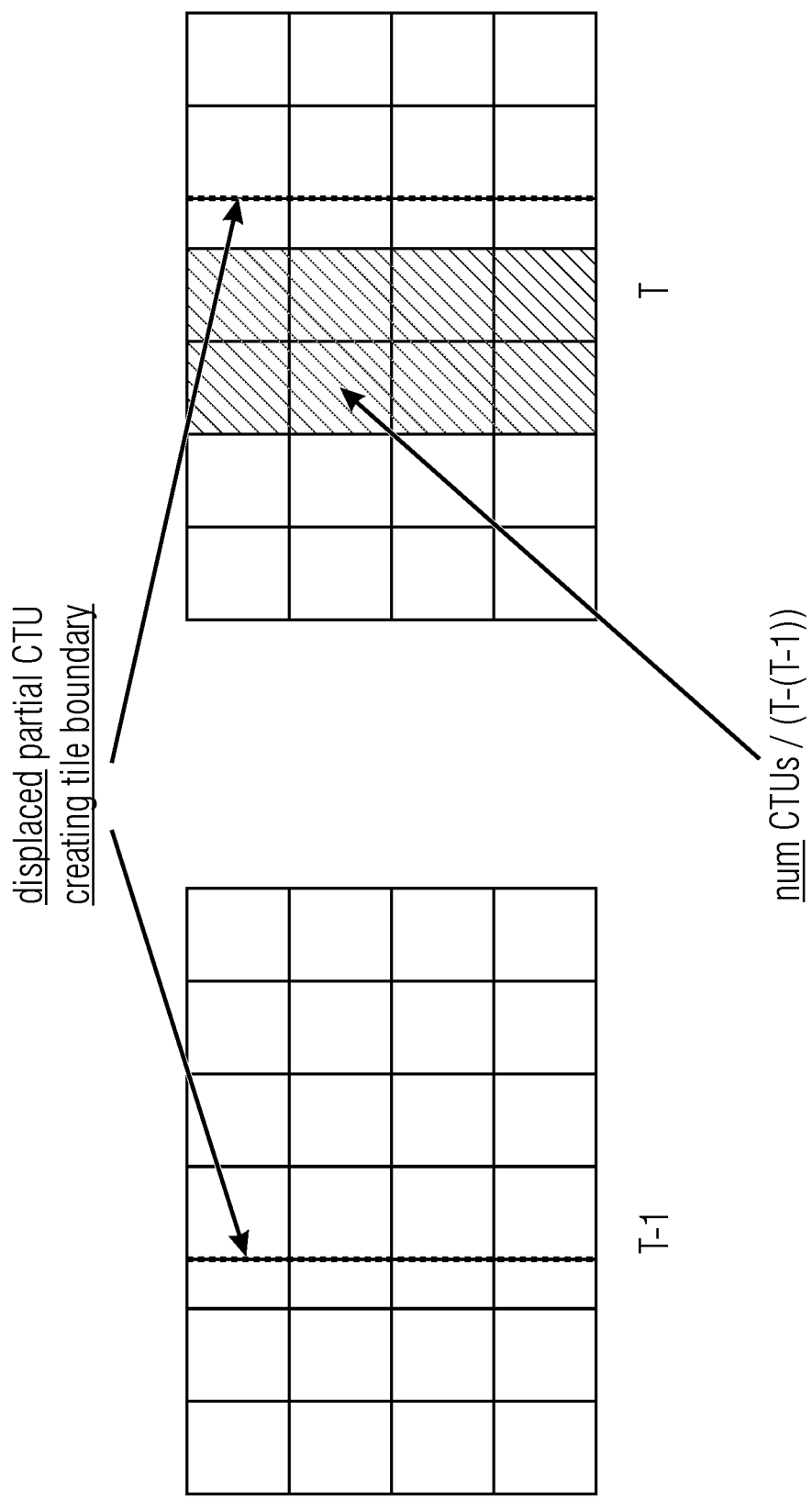
FIG. 7 illustrates a rate of grid mismatch affected CTUs.

The fifth aspect of the invention is now described in detail:

In the fifth aspect, a limitation is applied for the rate of blocks, in which with grid mismatches may occur between pictures with changing partial tile boundaries as illustrated in FIG. 7. This constraint may either be defined in a default manner for a given profile/level, or indicated as a syntax element in the bitstream, e.g. num_misaligned_ctus_per_picture. FIG. 7 illustrates a rate of grid mismatch affected CTUs.

Alternatively, the constraint described here, where the number of partial (boundary) CTUs stays constant and with same ratio, can be implemented as a simple constraint indication, e.g. misalignment_constant_flag, where indication of tile boundaries stays flexible but has to fulfill the constraint or can be achieved by a less flexible manner.

The sixth aspect of the invention is now described in detail: In the sixth aspect, CTU misalignment is completely avoided: two set of tile boundaries are defined. The first set of tile boundaries corresponds to traditional tile boundaries:

Entropy coding reset

Intra prediction constraints

Scan order change

And in addition, tiles of the first set allow creating partial CTUs at the right and bottom tile boundaries.

The second set of tile boundaries does solely create partial CTUs at the right and/or bottom tile boundaries, i.e. to the left and/or above of said tile boundaries and does not imply entropy coding reset, intra prediction or a change in scan order. Thereby, the location of partial CTUs within the picture can (and is constraint to) remain static while actual tile configuration is allowed to change over time.

Figure 8:
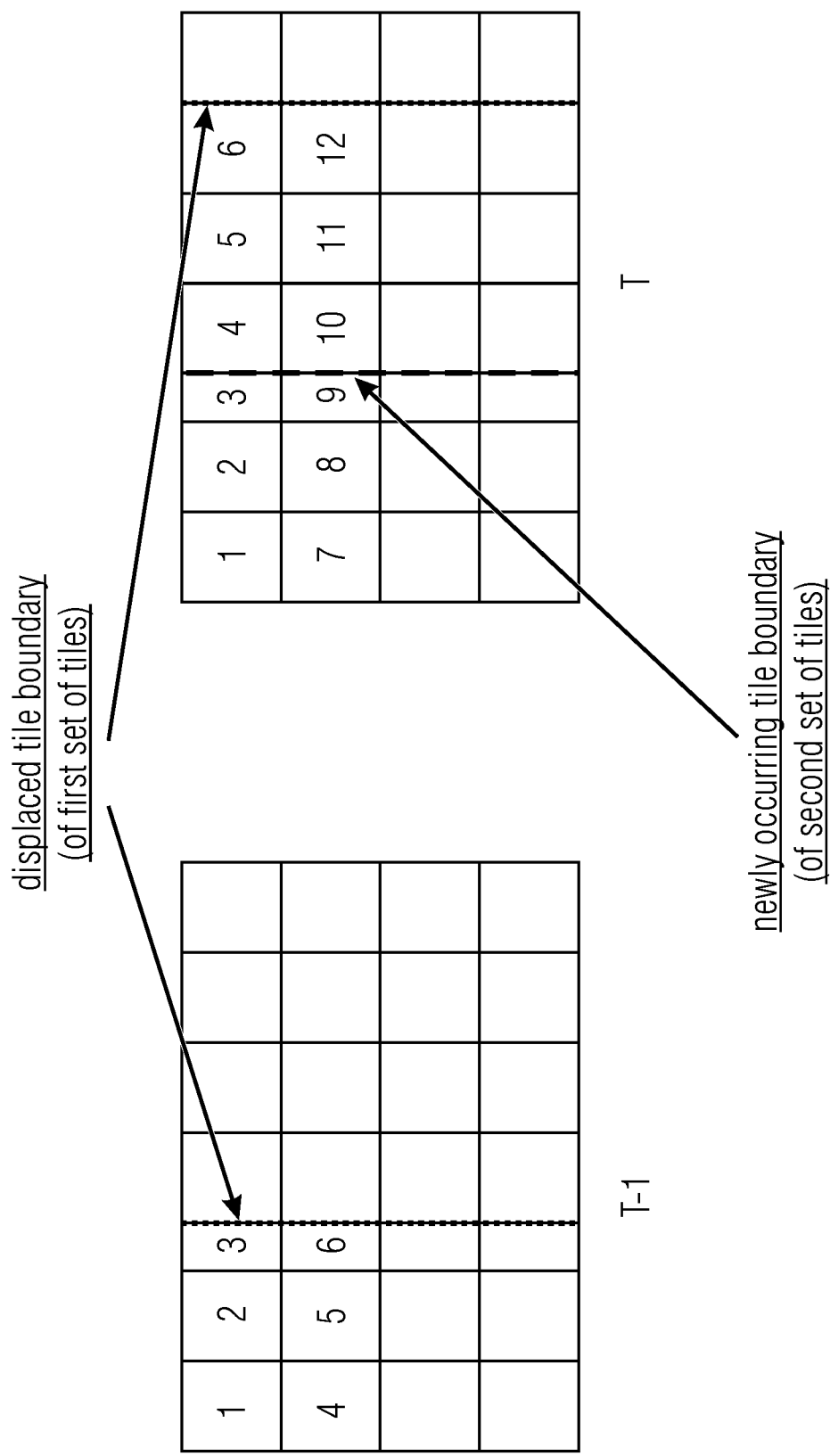
FIG. 8 illustrates two sets of tile boundaries.

FIG. 8 illustrates two sets of tile boundaries. Within a CVS, tile boundaries that change position are not allowed to create new partial tiles. FIG. 8 illustrates the invention based on two pictures of different time instants where the tile boundary of the first set changes position from time instant T-1 to time instant T and a new tile boundary of the second set is introduced to keep the position of partial CTUs at time instant T similar to time instant T-1, albeit the occurring changes to scan order, entropy coding and intra prediction.

The seventh aspect of the invention is now described in detail:

In another independent embodiment, the problem is tackled to reduce the complexity impact partial CTUs introduce on line buffer requirements.

FIG. 9 illustrates corresponding CTU rows in reference picture after partial CTU in current picture.

A horizontal row of partial CTUs in one picture would lead a CTU grid misalignment with respect to reference picture without the row of partial CTUs as illustrated in FIG. 9 where a single row (Current CTU row) would access to CUs (CU=coding unit) of two CTU rows for tools such as ATMVP (Alternative Temporal Motion Vector Prediction).

As the collocated CTU row is often cached in a cost intensive high-speed memory in hardware implementations (referred to as line buffer), it is undesirable to hold multiple CTU rows in this cache. Therefore, in order to maintain CTU row alignment across picture in presence of partial CTU creating tile boundaries, another constraint is that horizontal tile boundaries that create partial CTUs above them are not allowed to change during a coded video sequence and are hence static.

In the following, predictors derivation from collocated CTUs according to embodiments is described.

In particular, the eighth aspect of the invention is now described in detail:

TMVP (Temporal Motion Vector Prediction) and ATMVP derivation currently depends on the pre-defined CTU size, i.e. using a constant CTU grid over the picture:

For TMVP:
If yCb>>CtbLog2SizeY is equal to yColBr>>CtbLog2SizeY, yColBr is less than pic_height_in_luma_samples and xColBr is less than pic_width_in_luma_samples
(in other words: if the bottom-right CB of the reference picture is in the same CTU row, hence it can be cached in a line buffer memory)
Then the right-bottom collocated predictor is taken. Otherwise (if the bottom-right CB of the reference picture is NOT in the same CTU row, hence it is NOT in the line buffer), the center-collocated predictor is taken.

And for ATMVP:
The location (xColSb, yColSb) of the collocated subblock inside ColPic is derived as follows.
xColSb=Clip3(xCtb, Min(CurPicWidthInSamplesY−1, xCtb+(1<<CtbLog2SizeY)+3), xSb+(tempMv[0]>>4))
yColSb=Clip3(yCtb, Min(CurPicHeightInSamplesY−1, yCtb+(1<<CtbLog2SizeY)−1), ySb+(tempMv[1]>>4))

In other words, coordinates of the collocated sub-blocks are clipped in each dimension to be inside the same CTU row. The same line buffer considerations hold true.

Both TMVP and ATMVP use the size of the pre-defined CTU CtbLog2SizeY that divides all samples of the coded picture(s) into coded blocks for derivation of the collocated blocks and subblocks.

With tiles borders, that are allowed to create partial CTUs, the CTU grid is not constant and may vary from picture to picture and create overlap between a varying number of CTU rows as illustrated in FIG. 9. In this part of the invention, the CTU grid of the current picture is imposed onto the reference frame to organize buffer management and predictor access. In other words, the current local partial CTU dimensions or size are applied for selecting the referenced area in the used (collocated) reference picture (as opposed to a constant maximum CTU size across the picture).

For TMVP, one embodiment of the invention is:
yTileStart and xTileStart correspond to the top-left sample position of a given tile hosting the current coding block with yCbInTile and xCbInTile correspond to the sample position of the current coding block relative to the tile start and collocated blocks correspondingly.
(Differences are highlighted in bold):
yCbInTile=yCb-yTileStart
yColBrInTile=yColBr-yTileStart
and CtbLog2HeightY(y) describing the height of the respective CTU row.
If yCbInTile>>CtbLog2HeightY(yCbInTile) is equal to yColBrInTile>>CtbLog2HeightY(yCbInTile), yColBr is less than pic_height_in_luma_samples and xColBr is less than pic_width_in_luma_samples then the right-bottom collocated predictor is taken. Otherwise, the center-collocated predictor is taken.

For ATMVP, an embodiment in form of an adjusted clipping operation is as follows: The location (xColSb, yColSb) of the collocated subblock inside ColPic is derived as follows.
xColSb=Clip3(xCtb, Min(CurPicWidthInSamplesY−1, xCtb+(1<<CtbLog2WidthY(xCtb))+3), xSb+(tempMv[0]>>4))
yColSb=Clip3(yCtb, Min(CurPicHeightInSamplesY−1, yCtb+(1<<CtbLog2HeightY(yCtb))−1), ySb+(tempMv[1]>>4))

In the following, sub-picture wise coding tool restriction indication is described.

In particular, the ninth aspect of the invention is now described in detail:

In former video coding standards, sub-picture (e.g. slices or tiles) wise coding restrictions are distinguished as follows:
I_SLICE—intra coding, usually random access points, does not use references to other pictures
P_SLICE—predictive coding. Use one picture from one reference picture list for motion compensated prediction.
B_SLICE—bi-predictive coding with two reference picture lists. Allows combining motion compensated predictions from pictures in both lists.

The term slice or tile in this context are interchangeable, i.e. a group of consecutive-in-bitstream CTUs belonging to a single coded picture and being jointly entropy coded.

This differentiation allows two things, namely controlling the parsing and decoding process of the respective sub-picture right on from slice or tile header parsing, and profiling based on such types by for instance prohibiting usage of computationally complex types such as B_SLICES.

The type indication can also be interpreted as a bag of constraints associated with each type, e.g. the I_SLICE type being the most restricted type, P_SLICE type relaxing the constraint to include inter-prediction using one reference picture and B_SLICE type relaxing the constraint further to include reference from both temporally preceding and following pictures by allowing a bitstream order of pictures different from the presentation order The following problems arise:
I_SLICE type can also comprise "current picture referencing", which is a P_SLICE type like "motion" compensated or translation compensated block based prediction using the currently coded picture as reference
P_SLICE is not used frequently anymore and mostly replaced by B_SLICE in applications
Inter-prediction has evolved beyond usage of two reference frames Current picture referencing as referred to above imposes additional complexity to the decoding process compared to traditional intra prediction. Traditionally, intra prediction relies only on sample values within the current picture which are in close proximity to the currently predicted block, e.g. the directly neighboring samples or, in so called multi-reference-line prediction, a small number (e.g. 3) of lines of directly neighboring samples, to generate the sample values of the predicted block, e.g. through interpolation. Current picture referencing on the other hand relies on mechanisms formerly only used in inter-prediction between frames of a video sequence in which the sample values of a reference block are copied to the current block location, the amount of samples accessed to generate the predictor in this technique is much higher than regular intra-prediction. For one, the predictor samples are not only derived from much fewer accessed samples compared but the search on encoder side to derive a suitable motion vector or displacement information is much higher. Furthermore, the reference picture has to be updated along the decoding process of the current picture to reflect the availability of ever greater regions on the current picture, i.e. the reconstructed regions, for reference.

In one embodiment of the invention, instead of using the above type distinction, the actual imposed tool constraints are signaled in the (tile) header.

1) A flag should be used to indicate whether the use of reference picture other than the current picture may be used (intra/inter switch)

2) A flag shall be used to indicate the use of current picture referencing (inter-prediction using the currently coded picture). This may be signaled depending on the intra/inter selection.

3) A syntax element is signaled to indicate the number of reference picture lists that are used in the prediction process. In the case that current picture referencing only is used, this syntax element may be inferred to be equal to 1. In other cases the value of 1 refers to what previously was a P_SLICE type, while 2 refers to former B_SLICE type. Additional values may be used for instance to indicate multi-hypothesis prediction.

An example syntax could be as follows:

|  | Descriptor |
|---|---|
| tile_header( ) { | |
| [...] | |
| current_picture_only_reference_flag | u(1) |
| current_picture_inter_reference_flag | u(1) |
| num_ref_pic_lists_active | ue(v) |
| [...] | | current_picture_only_reference_flag equal to 1 indicates that only using the current picture as reference is allowed. This is similar to classical I_SLICE type.
current_picture_inter_reference_flag equal to 1 indicates that the current picture is available for inter prediction ("Current picture referencing" or "Intra Block Copy" tools).
num_ref_pic_lists_active indicates the number of active reference pictures lists.

If current_picture_only_reference_flag is equal to 1 and current_picture_inter_reference_flag is equal to 0,
num_ref_pic_lists_active shall be active to zero (and could be omitted from the bitstream).

If current_picture_only_reference_flag is equal to 0,
num_ref_pic_lists_active equal to 1 would indicate a tile type similar to P_SLICE.
num_ref_pic_lists_active equal to 2 would indicate a tile type similar to B_SLICE.
num_ref_pic_lists_active larger than 2 can be used to indicate the use of more reference picture lists, e.g. for multi-hypothesis inter prediction.

In the following, further examples of the invention are provided:

Example 1: A video encoder (101) for encoding a plurality of pictures of a video by generating an encoded video signal, wherein each of the plurality of pictures comprises original picture data, wherein the video encoder (101) comprises:
a data encoder (110) configured for generating the encoded video signal comprising encoded picture data, wherein the data encoder is configured to encode the plurality of pictures of the video into the encoded picture data, and
an output interface (120) configured for outputting the encoded picture data of each of the plurality of pictures,
wherein, for each picture of the plurality of pictures, the data encoder (110) is configured to partition the picture into a plurality of tiles comprising a plurality of coding tree units of the picture, wherein each coding tree unit of the plurality of coding tree units comprises a plurality of samples of the picture,
wherein, for each picture of the plurality of pictures, each coding tree unit of the plurality of coding tree units of the picture is either a partial unit or a full unit, wherein the coding tree unit is the partial unit, if the number of samples of the coding tree unit is smaller than a predefined sample number, and wherein the coding tree unit is the full unit, if the number of samples of the coding tree unit is not smaller than the predefined sample number,
wherein the data encoder (110) is configured to partition each of the plurality of pictures such that each picture of the plurality of pictures comprises a same first number of partial units among the plurality of coding tree units of the picture,
wherein, for each picture of the plurality of pictures, the data encoder (110) is configured to encode the original picture data of each of the plurality of tiles of the picture independently from the original picture data of any other tile of the plurality of tiles of the picture.

Example 2: A video encoder (101) according to example 1,
wherein the data encoder (110) is configured to partition each picture of the plurality of pictures into the plurality of tiles such that each tile of the plurality of tiles of each picture of the plurality of pictures comprises a same second number of partial units among the plurality of coding tree units of the tile.

Example 3: A video encoder (101) according to example 2,
wherein the data encoder (110) comprises at least two processors, and
wherein the data encoder (110) is configured to encode the original picture data of a first tile of the plurality of tiles of one of the plurality of pictures by a first processor of the at least two processors,
wherein the data encoder (110) is configured to encode the original picture data of a second tile of the plurality of tiles of the one of the plurality of pictures by a second processor of the at least two processors, and
wherein the first processor and the second processor are arranged such that the first processor encodes the original picture data of the first tile in parallel to the second processor encoding the original picture data of the second tile.

Example 4: A video encoder (101) according to one of examples 1 to 3,
wherein the data encoder (120) is configured to generate the encoded video signal such that the encoded video signal further comprises a flag indicating that each picture of the plurality of pictures comprises the same first number of partial units among the plurality of coding tree units of the picture.

Example 5: A video encoder (101) according to one of examples 1 to 4,
wherein, for each picture of the plurality of pictures, the data encoder (110) is configured to partition the picture into the plurality of coding tree units, such that each coding tree unit of the plurality of coding tree units comprises a number of the samples of the picture being equal to a predefined sample number or being smaller than the predefined sample number.

Example 6: A video encoder (101) for encoding a plurality of pictures of a video by
generating an encoded video signal, wherein each of the plurality of pictures comprises original picture data, wherein the video encoder (101) comprises:
a data encoder (110) configured for generating the encoded video signal comprising encoded picture data, wherein the data encoder is configured to encode the plurality of pictures of the video into the encoded picture data, and
an output interface (120) configured for outputting the encoded picture data of each of the plurality of pictures,
wherein, for each picture of the plurality of pictures, a partitioning of the picture defines in a first way, how the picture is partitioned into a plurality of tiles comprising a plurality of coding tree units of the picture, wherein each coding tree unit of the plurality of coding tree units comprises a plurality of samples of the picture,
wherein, for each picture of the plurality of pictures, the data encoder (110) is configured to determine a complexity value depending on a number of samples of each of the plurality of coding tree units of each of the plurality of tiles of the picture,
wherein, if the complexity value is greater than a complexity threshold value, the data encoder (110) is configured to adapt the partitioning of the picture and is configured to define in a different, second way, how the picture is partitioned,
wherein, for each picture of the plurality of pictures, the data encoder (110) is configured to encode, depending on the partitioning of the picture, the original picture data of each of the plurality of tiles of the picture independently from the original picture data of any other tile of the plurality of tiles of the picture.

Example 7: A video encoder (110) according to example 6,
wherein, for each picture of the plurality of pictures, the data encoder (110) is configured to determine the complexity value by determining a CTU-dependent value for each coding tree unit of the plurality of coding tree units of each of the plurality of tiles of the picture, wherein the CTU-dependent value of the coding tree unit depends on whether the coding tree unit is a partial unit or whether the coding tree unit is a full unit,
wherein the coding tree unit is a partial unit, if the number of samples of the coding tree unit is smaller than a predefined sample number, and
wherein the coding tree unit is a full unit, if the number of samples of the coding tree unit is not smaller than the predefined sample number.

Example 8: A video encoder (110) according to example 7,
wherein a predefined minimum size exists, so that each of the plurality of coding tree units of each of the plurality of pictures being a partial unit comprises at least the predefined minimum size of the plurality of samples of the picture.

Example 9: A video encoder (110) according to example 8,
wherein each of the plurality of coding tree units of each of the plurality of pictures being a partial unit comprises has a minimum horizontal sample length and a minimum vertical sample length, wherein a number of samples of the minimum horizontal sample length is equal to a number of samples of the minimum vertical sample length.

Example 10: A video encoder (110) according to one of examples 7 to 9,
wherein, for each picture of the plurality of pictures, the data encoder (110) is configured to determine the complexity value by adding the CTU-dependent values of the plurality of coding tree units of the plurality of tiles of the picture.

Example 11: A video encoder (110) according to example 10,
wherein, for each picture of the plurality of pictures, the data encoder (110) is configured to determine the CTU-dependent value for each coding tree unit of the plurality of coding tree units of each of the plurality of tiles of the picture,
such that the CTU-dependent value depends on the number of samples of the coding tree unit, if the coding tree unit is a full unit, and
such that the CTU-dependent value depends on the number of samples of the coding tree unit and further depends on a complexity factor, if the coding tree unit is a partial unit.

Example 12: A video encoder (110) according to example 11,
wherein, for each picture of the plurality of pictures, the data encoder (110) is configured to determine the CTU-dependent value for each coding tree unit of the plurality of coding tree units of each of the plurality of tiles of the picture,
such that the CTU-dependent value is the number of samples of the coding tree unit, if the coding tree unit is a full unit, and
such that the CTU-dependent value is a product of the complexity factor times the number of samples of the coding tree unit, if the coding tree unit is a partial unit, wherein the complexity factor is a scalar value being different from 0.

Example 13: A video encoder (110) according to example 10,
wherein, for each picture of the plurality of pictures, the data encoder (110) is configured to determine the CTU-dependent value for each coding tree unit of the plurality of coding tree units of each of the plurality of tiles of the picture,
such that the CTU-dependent value depends on the number of samples of the coding tree unit, if the coding tree unit is a full unit, and
such that the CTU-dependent value is equal to the CTU-dependent value of another one of the plurality of coding tree units being a full unit, if the coding tree unit is a partial unit.

Example 14: A video encoder (101) for encoding a plurality of pictures of a video by generating an encoded video signal, wherein each of the plurality of pictures comprises original picture data, wherein the video encoder (101) comprises:
a data encoder (110) configured for generating the encoded video signal comprising encoded picture data, wherein the data encoder is configured to encode the plurality of pictures of the video into the encoded picture data, and
an output interface (120) configured for outputting the encoded picture data of each of the plurality of pictures,
wherein, for each picture of the plurality of pictures, the picture is partitioned into a plurality of tiles comprising a plurality of coding tree units of the picture, wherein each coding tree unit of the plurality of coding tree units comprises a plurality of samples of the picture, wherein, for each picture of the plurality of pictures, each coding tree unit of the plurality of coding tree units of each of the plurality of tiles of the picture, the coding tree unit is either a partial unit or a full unit, wherein the coding tree unit is the partial unit, if the number of samples of the coding tree unit is smaller than a predefined sample number, and wherein the coding tree unit is the full unit, if the number of samples of the coding tree unit is not smaller than the predefined sample number, wherein, for each picture of the plurality of pictures, the data encoder (110) is configured to encode the original picture data of each of the plurality of tiles of the picture independently from the original picture data of any other tile of the plurality of tiles of the picture, wherein the data encoder (110) is configured to generate the encoded video signal such that the encoded video signal further comprises indication data providing information on a number of the coding tree units that are partial units among the plurality of coding tree units of a tile of the plurality of tiles of a picture of the plurality of pictures.

Example 15: A video encoder (101) according to example 14, wherein the indication data indicates a maximum number of the coding tree units that are the partial units among the plurality of coding tree units of the tile.

Example 16: A video encoder (101) according to example 13, wherein the maximum number of the coding tree units that are the partial units among the plurality of coding tree units of the tile depends on a maximum tile size.

Example 17: A video encoder (101) according to example 15 or 16, wherein the maximum number of the coding tree units that are the partial units among the plurality of coding tree units of the tile depends on a first number of samples of one of the plurality of coding tree units which is a full unit, the first number being the predefined sample number, and further depends on a second number of samples of another one of the plurality of coding tree units which is a partial unit.

Example 18: A video encoder (101) according to one of examples 14 to 17, wherein the indication data indicates a relative amount of the coding tree units that are the partial units among the plurality of coding tree units of the tile.

Example 19: A video encoder (101) for encoding a plurality of pictures of a video by generating an encoded video signal, wherein each of the plurality of pictures comprises original picture data, wherein the video encoder (101) comprises:

a data encoder (110) configured for generating the encoded video signal comprising encoded picture data, wherein the data encoder is configured to encode the plurality of pictures of the video into the encoded picture data, and an output interface (120) configured for outputting the encoded picture data of each of the plurality of pictures, wherein, for each picture of the plurality of pictures, the data encoder (110) is configured to partition the picture into a plurality of tiles comprising a plurality of coding tree units of the picture, wherein each coding tree unit of the plurality of coding tree units comprises a plurality of samples of the picture, wherein for each coding tree unit of the plurality of coding tree units of each of the plurality of tiles of the picture, the coding tree unit is either a partial unit or a full unit, wherein the coding tree unit is the partial unit, if the number of samples of the coding tree unit is smaller than a predefined sample number, and wherein the coding tree unit is the full unit, if the number of samples of the coding tree unit is not smaller than the predefined sample number, wherein for at least two pictures of the plurality of pictures, the data encoder (110) is configured to partition the picture such that the at least two pictures have a same partial-to-full-unit ratio, wherein the partial-to-full-unit ratio defines for a picture of the plurality of pictures a ratio of a number of the coding tree units of the picture that are partial units to a number of the coding tree units of the picture that are full units, wherein, for each picture of the plurality of pictures, the data encoder (110) is configured to encode the original picture data of each of the plurality of tiles of the picture independently from the original picture data of any other tile of the plurality of tiles of the picture.

Example 20: A video encoder (101) according to example 19, wherein for each of the plurality of pictures, the data encoder (110) is configured to partition the picture such that each of the plurality of pictures has the partial-to-full-unit ratio being smaller than a threshold value.

Example 21: A video encoder (101) according to example 19 or 20, wherein the threshold value is 1.

Example 22: A video encoder (101) according to one of examples 19 to 21, wherein for each of the plurality of pictures, the data encoder (110) is configured to partition the picture such that the plurality of pictures have the same partial-to-full-unit ratio.

Example 23: A video encoder (101) according to one of examples 1 to 5 or according to one of examples 7 to 22, wherein for each tile of the plurality of tiles of each picture of the plurality of pictures, coding tree units of the tile that are partial units appear only at a bottom border or at a right border of the tile.

Example 24: A video encoder (101) for encoding a plurality of pictures of a video by generating an encoded video signal, wherein each of the plurality of pictures comprises original picture data, wherein the video encoder (101) comprises:

a data encoder (110) configured for generating the encoded video signal comprising encoded picture data, wherein the data encoder is configured to encode the plurality of pictures of the video into the encoded picture data, and an output interface (120) configured for outputting the encoded picture data of each of the plurality of pictures, wherein, for each picture of the plurality of pictures, the data encoder (110) is configured to partition the picture into a plurality of tiles comprising a plurality of coding tree units of the picture, wherein each coding tree unit of the plurality of coding tree units comprises a plurality of samples of the picture and has a position within the picture, wherein the plurality of pictures comprises a current picture and a reference picture, wherein for each coding tree unit of the coding tree units of the current picture, the coding tree unit is correctly aligned, if another coding tree unit among the plurality of coding tree units of the reference picture exists, the position of said another coding tree unit within the reference picture being equal to the position of said coding tree unit within the current picture, wherein for each coding tree unit of the coding tree units of the current picture, the coding tree unit is misaligned, if no other coding tree unit among the plurality of coding tree units of the reference picture exists, having a position within the reference picture being equal to the position of said coding tree unit within the current picture, wherein the data encoder (110) is configured to partition the current picture into the plurality of tiles such that a ratio between the coding tree units of the current picture being misaligned to the coding tree units of the current picture being correctly aligned is not greater than a threshold value, wherein, for each picture of the plurality of pictures, the data encoder (110) is configured to encode the original picture data of each of the plurality of tiles of the picture independently from the original picture data of any other tile of the plurality of tiles of the picture.

Example 25: A video encoder (101) according to example 24, wherein for each coding tree unit of the plurality of coding tree units of each of the plurality of tiles of the picture, the coding tree unit is either a partial unit or a full unit, wherein the coding tree unit is the partial unit, if the number of samples of the coding tree unit is smaller than a predefined sample number, and wherein the coding tree unit is the full unit, if the number of samples of the coding tree unit is not smaller than the predefined sample number, wherein two or more of the plurality of coding tree units being said full unit and wherein at least one of the plurality of coding tree units being said partial unit.

Example 26: A video encoder (101) according to example 24 or 25, wherein the data encoder (110) is configured to receive a bitstream comprising the threshold value.

Example 27: A video encoder (101) according to one of examples 24 to 26, wherein the threshold value is smaller than 1.

Example 28: A video encoder (101) for encoding a plurality of pictures of a video by generating an encoded video signal, wherein each of the plurality of pictures comprises original picture data, wherein the video encoder (101) comprises:

a data encoder (110) configured for generating the encoded video signal comprising encoded picture data, wherein the data encoder is configured to encode the plurality of pictures of the video into the encoded picture data, and an output interface (120) configured for outputting the encoded picture data of each of the plurality of pictures, wherein, for each picture of the plurality of pictures, the data encoder (110) is configured to partition the picture into a plurality of tiles comprising a plurality of coding tree units of the picture by defining a plurality of tile boundaries for each tile of the plurality of tiles, wherein each coding tree unit of the plurality of coding tree units of each picture of the plurality of pictures comprises a plurality of samples of the picture, wherein, for each picture of the plurality of pictures, the data encoder (110) is configured to encode, depending on the plurality of tile boundaries of each tile of the plurality of tiles of the picture, the original picture data of said tile independently from the original picture data of any other tile of the plurality of tiles of the picture, wherein each tile boundary of the plurality of tile boundaries of each of the plurality of tiles of each of the plurality of pictures is either assigned to a first set of tile boundaries or is assigned to a second set of tile boundaries, wherein the data encoder (110) is configured to change an encoding scan order at a first tile boundary of the plurality of tile boundaries of a first tile of the plurality of tiles of a picture of the plurality of pictures, when encoding the original picture data, if said tile boundary is assigned to the first set of tile boundaries, and wherein the data encoder (110) is configured to not change the encoding scan order at a second tile boundary of the plurality of tile boundaries of a second tile of the plurality of tiles of a picture of the plurality of pictures, when encoding the original picture data, if said tile boundary is assigned to the second set of tile boundaries.

Example 29: A video encoder (101) according to example 28, wherein the data encoder (110) is configured to apply an intra prediction constraint at a third tile boundary of the plurality of tile boundaries of a third tile of the plurality of tiles of a picture of the plurality of pictures, when encoding the original picture data, if said tile boundary is assigned to the first set of tile boundaries, and wherein the data encoder (110) is configured to not apply the intra prediction constraint at a fourth tile boundary of the plurality of tile boundaries of a fourth tile of the plurality of tiles of a picture of the plurality of pictures, when encoding the original picture data, if said tile boundary is assigned to the second set of tile boundaries.

Example 30: A video encoder (101) according to example 29, wherein the data encoder (110) is configured to conduct an entropy coding reset constraint at a fifth tile boundary of the plurality of tile boundaries of a fifth tile of the plurality of tiles of a picture of the plurality of pictures, when encoding the original picture data, if said tile boundary is assigned to the first set of tile boundaries, and wherein the data encoder (110) is configured to not conduct the entropy coding reset at a sixth tile boundary of the plurality of tile boundaries of a sixth tile of the plurality of tiles of a picture of the plurality of pictures, when encoding the original picture data, if said tile boundary is assigned to the second set of tile boundaries.

Example 31: A video encoder (101) according to one of examples 28 to 30, wherein each coding tree unit of the plurality of coding tree units of each picture of the plurality of pictures has a position within the picture, wherein the plurality of pictures comprises a current picture and a reference picture, wherein for each coding tree unit of the coding tree units of the current picture, the coding tree unit is correctly aligned, if another coding tree unit among the plurality of coding tree units of the reference picture exists, the position of said another coding tree unit within the reference picture being equal to the position of said coding tree unit within the current picture, wherein for each coding tree unit of the coding tree units of the current picture, the coding tree unit is misaligned, if no other coding tree unit among the plurality of coding tree units of the reference picture exists, having a position within the reference picture being equal to the position of said coding tree unit within the current picture, wherein the data encoder (110) is configured to partition the current picture into the plurality of tiles such that more than half of the coding tree units of the current picture are correctly aligned, and such that less than half of the coding tree units of the current picture are misaligned.

Example 32: A video encoder (101) according to example 31, wherein, for each picture of the one or more subsequent pictures, the data encoder (110) is configured to partition the picture into the plurality of tiles such that all of the coding tree units of the picture are correctly aligned, and such that none of the coding tree units of the picture are misaligned.

Example 33: A video encoder (101) for encoding a plurality of pictures of a video by generating an encoded video signal, wherein each of the plurality of pictures comprises original picture data, wherein the video encoder (101) comprises:

a data encoder (110) configured for generating the encoded video signal comprising encoded picture data, wherein the data encoder is configured to encode the plurality of pictures of the video into the encoded picture data, and an output interface (120) configured for outputting the encoded picture data of each of the plurality of pictures, wherein, for each picture of the plurality of pictures, the data encoder (110) is configured to partition the picture into a plurality of tiles comprising a plurality of coding tree units of the picture, wherein each coding tree unit of the plurality of coding tree units comprises a plurality of samples of the picture and has a position within the picture, wherein the plurality of pictures comprises a current picture and a reference picture, wherein for each coding tree unit of the coding tree units of the current picture, the coding tree unit is correctly aligned, if another coding tree unit among the plurality of coding tree units of the reference picture exists, the position of said another coding tree unit within the reference picture being equal to the position of said coding tree unit within the current picture, wherein for each coding tree unit of the coding tree units of the current picture, the coding tree unit is misaligned, if no other coding tree unit among the plurality of coding tree units of the reference picture exists, having a position within the reference picture being equal to the position of said coding tree unit within the current picture, wherein the plurality of coding tree units of the current picture is arranged within the current picture such that the plurality of coding tree units of the current picture form one or more rows of coding tree units of the current picture, wherein the data encoder (110) is configured to partition the current picture such that there exists no row among the one or more rows of the current picture where any coding tree unit of said row is misaligned, wherein the data encoder (110) is configured to encode the original picture data of each of the plurality of tiles of the current picture independently from the original picture data of any other tile of the plurality of tiles of the current picture.

Example 34: A video encoder (101) according to example 33, wherein the data encoder (110) is configured to generate the encoded video signal such that the encoded video signal comprises an indication that no row among the one or more rows of the picture exists, where any coding tree unit of said row is misaligned.

Example 35: A video encoder (101) for encoding a plurality of pictures of a video by generating an encoded video signal, wherein each of the plurality of pictures comprises original picture data, wherein the video encoder (101) comprises:

a data encoder (110) configured for generating the encoded video signal comprising encoded picture data, wherein the data encoder is configured to encode the plurality of pictures of the video into the encoded picture data, and an output interface (120) configured for outputting the encoded picture data of each of the plurality of pictures, wherein, for each picture of the plurality of pictures, the data encoder (110) is configured to partition the picture into a plurality of tiles comprising a plurality of coding tree units of the picture, wherein each coding tree unit of the plurality of coding tree units comprises a plurality of samples of the picture and has a position within the picture, wherein the plurality of pictures comprises a current picture and a reference picture, wherein the reference picture precedes the current picture in time, wherein the data encoder (110) is configured to determine a motion vector of the current picture depending on a motion vector of the reference picture and depending on how the current picture is partitioned, and wherein the data encoder (110) is configured to encode, depending on the motion vector of the current picture, the original picture data of each of the plurality of tiles of the current picture independently from the original picture data of any other tile of the plurality of tiles of the picture.

Example 36: A video encoder (101) according to example 35, wherein the data encoder (110) is configured to determine the motion vector of the current picture by selecting a first motion vector predictor at a first location within the reference picture or a second motion vector predictor at a second location within the reference picture depending on a location of the motion vector of the current picture and depending on how the current picture is partitioned.

Example 37: A video encoder (101) according to example 36, wherein for each coding tree unit of the coding tree units of the current picture, the coding tree unit is misaligned, if no other coding tree unit among the plurality of coding tree units of the reference picture exists, having a position within the reference picture being equal to the position of said coding tree unit within the current picture, and wherein at least two coding tree units of the plurality of coding tree units of the current picture are misaligned.

Example 38: A video encoder (101) according to example 35, wherein the data encoder (110) is configured to determine a motion vector of the current picture
by determining a position of a related block in the reference picture depending on how the current picture is partitioned, by determining a location of a motion vector predictor in the reference picture depending on a location of the motion vector in the current block, and by applying a clipping operation on the location of the motion vector predictor in the reference picture to adapt the location of the motion vector predictor in the reference picture depending on how the current picture is partitioned.

Example 39: A video encoder (101) according to one of examples 24 to 38, wherein, for each picture of the plurality of pictures, each coding tree unit of the plurality of coding tree units of the picture is either a partial unit or a full unit, wherein the coding tree unit is the partial unit, if the number of samples of the coding tree unit is smaller than a predefined sample number, and wherein the coding tree unit is the full unit, if the number of samples of the coding tree unit is not smaller than the predefined sample number, wherein for each tile of the plurality of tiles of each picture of the plurality of pictures, coding tree units of the tile that are partial units appear only at a bottom border or at a right border of the tile.

Example 40: A video encoder (101) for encoding a plurality of pictures of a video by generating an encoded video signal, wherein each of the plurality of pictures comprises original picture data, wherein the video encoder (101) comprises:

a data encoder (110) configured for generating the encoded video signal comprising encoded picture data, wherein the data encoder is configured to encode the plurality of pictures of the video into the encoded picture data, and an output interface (120) configured for outputting the encoded picture data of each of the plurality of pictures, wherein, for each picture of the plurality of pictures, the data encoder (110) is configured to partition the picture into a plurality of tiles comprising a plurality of coding tree units of the picture, wherein each coding tree unit of the plurality of coding tree units comprises a plurality of samples of the picture, wherein, for each picture of the plurality of pictures, the data encoder (110) is configured to encode the original picture data of each of the plurality of tiles of the picture, wherein the data encoder (110) is configured to generate the encoded video signal such that the encoded video signal further comprises a first flag that indicates for a current picture of the plurality of pictures, whether a reference picture of the plurality of pictures being different from the current picture has been used for encoding the current picture.

Example 41: A video encoder (101) according to example 40, wherein the data encoder (110) is configured to generate the encoded video signal such that the encoded video signal further comprises a second flag that indicates whether current picture referencing is used, wherein using the current picture referencing comprises copying a reference block of a picture of the plurality of pictures to a current block of said picture, being different from the reference block.

Example 42: A video encoder (101) according to example 40 or 41, wherein the data encoder (110) is configured to generate the encoded video signal such that the encoded video signal further comprises a syntax element that indicates a number of reference picture lists that are used in prediction.

Example 43: A video encoder (101) according to example 42, wherein the data encoder (110) is configured to set the syntax element that indicates the number of the reference picture lists that are used in prediction to a value 0 or to a value 1 or to a value 2, but not to a different value.

Example 44: A video encoder (101) according to example 42, wherein the data encoder (110) is configured to set the syntax element that indicates the number of the reference picture lists that are used in prediction to a value 0 or to a value 1 or to a value 2 or to an integer value being greater than 2.

Example 45: A video decoder (151) for decoding an encoded video signal comprising encoded picture data to reconstruct a plurality of pictures of a video, wherein the video decoder (151) comprises:

an input interface (160) configured for receiving the encoded video signal, and a data decoder (170) configured for reconstructing the plurality of pictures of the video by decoding the encoded picture data, wherein, for each picture of the plurality of pictures, the picture is partitioned into a plurality of tiles comprising a plurality of coding tree units of the picture, wherein each coding tree unit of the plurality of coding tree units comprises a plurality of samples of the picture, wherein, for each picture of the plurality of pictures, each coding tree unit of the plurality of coding tree units of the picture is either a partial unit or a full unit, wherein the coding tree unit is the partial unit, if the number of samples of the coding tree unit is smaller than a predefined sample number, and wherein the coding tree unit is the full unit, if the number of samples of the coding tree unit is not smaller than the predefined sample number, wherein each of the plurality of pictures is partitioned such that each picture of the plurality of pictures comprises a same first number of partial units among the plurality of coding tree units of the picture, wherein, for each picture of the plurality of pictures, the data decoder (170) is configured to decode the encoded picture data of each of the plurality of tiles of the picture independently from the encoded picture data of any other tile of the plurality of tiles of the picture.

Example 46: A video decoder (151) according to example 45, wherein each picture of the plurality of pictures is partitioned into the plurality of tiles such that each tile of the plurality of tiles of each picture of the plurality of pictures comprises a same second number of partial units among the plurality of coding tree units of the tile.

Example 47: A video decoder (151) according to example 46, wherein the data decoder (170) comprises at least two processors, and wherein the data decoder (170) is configured to decode the encoded picture data of a first tile of the plurality of tiles of one of the plurality of pictures by a first processor of the at least two processors, wherein the data decoder (170) is configured to decode the encoded picture data of a second tile of the plurality of tiles of the one of the plurality of pictures by a second processor of the at least two processors, and wherein the first processor and the second processor are arranged such that the first processor decodes the encoded picture data of the first tile in parallel to the second processor decoding the encoded picture data of the second tile.

Example 48: A video decoder (151) according to one of examples 45 to 47, wherein the encoded video signal further comprises a flag indicating that each picture of the plurality of pictures comprises the same first number of partial units among the plurality of coding tree units of the picture, wherein, for each picture of the plurality of pictures, the data decoder (170) is configured to decode the encoded picture data of each of the plurality of tiles of the picture depending on the flag, independently from the encoded picture data of any other tile of the plurality of tiles of the picture.

Example 49: A video decoder (151) according to one of examples 45 to 48, wherein, for each picture of the plurality of pictures, the picture is partitioned into the plurality of coding tree units, such that each coding tree unit of the plurality of coding tree units comprises a number of the samples of the picture being equal to a predefined sample number or being smaller than the predefined sample number.

Example 50: A video decoder (151) for decoding an encoded video signal comprising encoded picture data to reconstruct a plurality of pictures of a video, wherein the video decoder (151) comprises:

an input interface (160) configured for receiving the encoded video signal, and a data decoder (170) configured for reconstructing the plurality of pictures of the video by decoding the encoded picture data, wherein, for each picture of the plurality of pictures, the picture is partitioned into a plurality of tiles comprising a plurality of coding tree units of the picture, wherein each coding tree unit of the plurality of coding tree units comprises a plurality of samples of the picture, wherein, for each picture of the plurality of pictures, the data decoder (110) is configured to determine a complexity value depending on a number of samples of each of the plurality of coding tree units of each of the plurality of tiles of the picture, and wherein, for each picture of the plurality of pictures, the data decoder (170) is configured to decode depending on the complexity value the encoded picture data of each of the plurality of tiles of the picture independently from the encoded picture data of any other tile of the plurality of tiles of the picture to obtain original picture data of the plurality of coding tree units of each of the plurality of pictures.

Example 51: A video decoder (151) according to example 50, wherein, for each picture of the plurality of pictures, data decoder (170) is configured to determine the complexity value by determining a CTU-dependent value for each coding tree unit of the plurality of coding tree units of each of the plurality of tiles of the picture, wherein the CTU-dependent value of the coding tree unit depends on whether the coding tree unit is a partial unit or whether the coding tree unit is a full unit, wherein the coding tree unit is a partial unit, if the number of samples of the coding tree unit is smaller than a predefined sample number, and wherein the coding tree unit is a full unit, if the number of samples of the coding tree unit is not smaller than the predefined sample number.

Example 52: A video decoder (151) according to example 51, wherein a predefined minimum size exists, so that each of the plurality of coding tree units of each of the plurality of pictures being a partial unit comprises at least the predefined minimum size of the plurality of samples of the picture.

Example 53: A video decoder (151) according to example 52, wherein each of the plurality of coding tree units of each of the plurality of pictures being a partial unit comprises has a minimum horizontal sample length and a minimum vertical sample length, wherein a number of samples of the minimum horizontal sample length is equal to a number of samples of the minimum vertical sample length.

Example 54: A video decoder (151) according to one of examples 51 to 53, wherein, for each picture of the plurality of pictures, the data decoder (170) is configured to determine the complexity value by adding the CTU-dependent values of the plurality of coding tree units of the plurality of tiles of the picture.

Example 55: A video decoder (151) according to example 54, wherein, for each picture of the plurality of pictures, the data decoder (170) is configured to determine the CTU-dependent value for each coding tree unit of the plurality of coding tree units of each of the plurality of tiles of the picture, such that the CTU-dependent value depends on the number of samples of the coding tree unit, if the coding tree unit is a full unit, and such that the CTU-dependent value depends on the number of samples of the coding tree unit and further depends on a complexity factor, if the coding tree unit is a partial unit.

Example 56: A video decoder (151) according to example 55, wherein, for each picture of the plurality of pictures, the data decoder (170) is configured to determine the CTU-dependent value for each coding tree unit of the plurality of coding tree units of each of the plurality of tiles of the picture, such that the CTU-dependent value is the number of samples of the coding tree unit, if the coding tree unit is a full unit, and such that the CTU-dependent value is a product of the complexity factor times the number of samples of the coding tree unit, if the coding tree unit is a partial unit, wherein the complexity factor is a scalar value being different from 0.

Example 57: A video decoder (151) according to example 51, wherein, for each picture of the plurality of pictures, the data decoder (170) is configured to determine the CTU-dependent value for each coding tree unit of the plurality of coding tree units of each of the plurality of tiles of the picture, such that the CTU-dependent value of the coding tree unit depends on the number of samples of the coding tree unit, if the coding tree unit is a full unit, and such that the CTU-dependent value of the coding tree unit is equal to the CTU-dependent value of another one of the plurality of coding tree units being a full unit, if the coding tree unit is a partial unit.

Example 58: A video decoder (151) for decoding an encoded video signal comprising encoded picture data to reconstruct a plurality of pictures of a video, wherein the video decoder (151) comprises:
an input interface (160) configured for receiving the encoded video signal, and
a data decoder (170) configured for reconstructing the plurality of pictures of the video by decoding the encoded picture data,
wherein, for each picture of the plurality of pictures, the picture is partitioned into a plurality of tiles comprising a plurality of coding tree units of the picture, wherein each coding tree unit of the plurality of coding tree units comprises a plurality of samples of the picture,
wherein, for each picture of the plurality of pictures, each coding tree unit of the plurality of coding tree units of each of the plurality of tiles of the picture, the coding tree unit is either a partial unit or a full unit, wherein the coding tree unit is the partial unit, if the number of samples of the coding tree unit is smaller than a predefined sample number, and wherein the coding tree unit is the full unit, if the number of samples of the coding tree unit is not smaller than the predefined sample number,
wherein the encoded video signal further comprises indication data providing information on a number of the coding tree units that are partial units among the plurality of coding tree units of a tile of the plurality of tiles of a picture of the plurality of pictures,
wherein, for each picture of the plurality of pictures, the data decoder (170) is configured to decode depending on the indication data the encoded picture data of each of the plurality of tiles of the picture independently from the encoded picture data of any other tile of the plurality of tiles of the picture to obtain original picture data of the plurality of coding tree units of each of the plurality of pictures.

Example 59: A video decoder (151) according to example 58,
wherein the indication data indicates a maximum number of the coding tree units that are the partial units among the plurality of coding tree units of the tile.

Example 60: A video decoder (151) according to example 59,
wherein the maximum number of the coding tree units that are the partial units among the plurality of coding tree units of the tile depends on a maximum tile size.

Example 61: A video decoder (151) according to example 59 or 60,
wherein the maximum number of the coding tree units that are the partial units among the plurality of coding tree units of the tile depends on a first number of samples of one of the plurality of coding tree units which is a full unit, the first number being the predefined sample number, and further depends on a second number of samples of another one of the plurality of coding tree units which is a partial unit.

Example 62: A video decoder (151) according to one of examples 58 to 61,
wherein the indication data indicates a relative amount of the coding tree units that are the partial units among the plurality of coding tree units of the tile.

Example 63: A video decoder (151) for decoding an encoded video signal comprising encoded picture data to reconstruct a plurality of pictures of a video, wherein the video decoder (151) comprises:
an input interface (160) configured for receiving the encoded video signal, and
a data decoder (170) configured for reconstructing the plurality of pictures of the video by decoding the encoded picture data,
wherein, for each picture of the plurality of pictures, the picture is partitioned into a plurality of tiles comprising a plurality of coding tree units of the picture, wherein each coding tree unit of the plurality of coding tree units comprises a plurality of samples of the picture,
wherein for each coding tree unit of the plurality of coding tree units of each of the plurality of tiles of the picture, the coding tree unit is either a partial unit or a full unit, wherein the coding tree unit is the partial unit, if the number of samples of the coding tree unit is smaller than a predefined sample number, and wherein the coding tree unit is the full unit, if the number of samples of the coding tree unit is not smaller than the predefined sample number,
wherein for at least two pictures of the plurality of pictures, the picture is partitioned such that the at least two pictures have a same partial-to-full-unit ratio, wherein the partial-to-full-unit ratio defines for a picture of the plurality of pictures a ratio of a number of the coding tree units of the picture that are partial units to a number of the coding tree units of the picture that are full units,
wherein, for each picture of the plurality of pictures, the data decoder (170) is configured to decode the encoded picture data of each of the plurality of tiles of the picture independently from the encoded picture data of any other tile of the plurality of tiles of the picture to obtain original picture data of the plurality of coding tree units of each of the plurality of pictures.

Example 64: A video decoder (151) according to example 63,
wherein for each of the plurality of pictures, the picture is partitioned such that each of the plurality of pictures has the partial-to-full-unit ratio being smaller than a threshold value.

Example 65: A video decoder (151) according to example 64,
wherein the threshold value is 1.

Example 66: A video decoder (151) according to one of examples 63 to 65,
wherein for each of the plurality of pictures, the picture is partitioned such that the plurality of pictures have the same partial-to-full-unit ratio.

Example 67: A video decoder (151) according to one of examples 45 to 49 or according to one of examples 51 to 66, wherein for each tile of the plurality of tiles of each picture of the plurality of pictures, coding tree units of the tile that are partial units appear only at a bottom border or at a right border of the tile.

Example 68: A video decoder (151) for decoding an encoded video signal comprising encoded picture data to reconstruct a plurality of pictures of a video, wherein the video decoder (151) comprises:
an input interface (160) configured for receiving the encoded video signal, and
a data decoder (170) configured for reconstructing the plurality of pictures of the video by decoding the encoded picture data, wherein, for each picture of the plurality of pictures, the picture is partitioned into a plurality of tiles comprising a plurality of coding tree units of the picture, wherein each coding tree unit of the plurality of coding tree units comprises a plurality of samples of the picture and has a position within the picture, wherein the plurality of pictures comprises a current picture and a reference picture, wherein for each coding tree unit of the coding tree units of the current picture, the coding tree unit is correctly aligned, if another coding tree unit among the plurality of coding tree units of the reference picture exists, the position of said another coding tree unit within the reference picture being equal to the position of said coding tree unit within the current picture, wherein for each coding tree unit of the coding tree units of the current picture, the coding tree unit is misaligned, if no other coding tree unit among the plurality of coding tree units of the reference picture exists, having a position within the reference picture being equal to the position of said coding tree unit within the current picture, wherein the current picture is partitioned into the plurality of tiles such that a ratio between the coding tree units of the current picture being misaligned to the coding tree units of the current picture being correctly aligned is not greater than a threshold value, wherein, for each picture of the plurality of pictures, the data decoder (170) is configured to decode the encoded picture data of each of the plurality of tiles of the picture independently from the encoded picture data of any other tile of the plurality of tiles of the picture to obtain original picture data of the plurality of coding tree units of each of the plurality of pictures.

Example 69: A video decoder (151) according to example 68,
wherein for each coding tree unit of the plurality of coding tree units of each of the plurality of tiles of the picture, the coding tree unit is either a partial unit or a full unit, wherein the coding tree unit is the partial unit, if the number of samples of the coding tree unit is smaller than a predefined sample number, and wherein the coding tree unit is the full unit, if the number of samples of the coding tree unit is not smaller than the predefined sample number,
wherein two or more of the plurality of coding tree units being said full unit and wherein at least one of the plurality of coding tree units being said partial unit.

Example 70: A video decoder (151) according to example 68 or 69,
wherein the data decoder (170) is configured to receive a bitstream comprising the threshold value.

Example 71: A video decoder (151) according to one of examples 68 to 70,
wherein the threshold value is smaller than 1.

Example 72: A video decoder (151) for decoding an encoded video signal comprising encoded picture data to reconstruct a plurality of pictures of a video, wherein the video decoder (151) comprises:
an input interface (160) configured for receiving the encoded video signal, and
a data decoder (170) configured for reconstructing the plurality of pictures of the video by decoding the encoded picture data,
wherein, for each picture of the plurality of pictures, the picture is partitioned into a plurality of tiles comprising a plurality of coding tree units of the picture by defining a plurality of tile boundaries for each tile of the plurality of tiles, wherein each coding tree unit of the plurality of coding tree units of each picture of the plurality of pictures comprises a plurality of samples of the picture, wherein, for each picture of the plurality of pictures, the data decoder (170) is configured to decode, depending on the plurality of tile boundaries of each tile of the plurality of tiles of the picture, the encoded picture data of said tile independently from the encoded picture data of any other tile of the plurality of tiles of the picture to obtain original picture data of the plurality of coding tree units of each of the plurality of pictures, wherein each tile boundary of the plurality of tile boundaries of each of the plurality of tiles of each of the plurality of pictures is either assigned to a first set of tile boundaries or is assigned to a second set of tile boundaries, wherein the data decoder (170) is configured to change a decoding scan order at a first tile boundary of the plurality of tile boundaries of a first tile of the plurality of tiles of a picture of the plurality of pictures, when decoding the encoded picture data, if said tile boundary is assigned to the first set of tile boundaries, and wherein the data decoder (170) is configured to not change the decoding scan order at a second tile boundary of the plurality of tile boundaries of a second tile of the plurality of tiles of a picture of the plurality of pictures, when decoding the encoded picture data, if said tile boundary is assigned to the second set of tile boundaries.

Example 73: A video decoder (151) according to example 72,
wherein the data decoder (170) is configured to apply an intra prediction constraint at a third tile boundary of the plurality of tile boundaries of a third tile of the plurality of tiles of a picture of the plurality of pictures, when decoding the encoded picture data, if said tile boundary is assigned to the first set of tile boundaries, and
wherein the data decoder (170) is configured to not apply the intra prediction constraint at a fourth tile boundary of the plurality of tile boundaries of a fourth tile of the plurality of tiles of a picture of the plurality of pictures, when decoding the encoded picture data, if said tile boundary is assigned to the second set of tile boundaries.

Example 74: A video decoder (151) according to example 73,
wherein the data decoder (170) is configured to conduct an entropy coding reset constraint at a fifth tile boundary of the plurality of tile boundaries of a fifth tile of the plurality of tiles of a picture of the plurality of pictures, when decoding the encoded picture data, if said tile boundary is assigned to the first set of tile boundaries, and
wherein the data decoder (170) is configured to not conduct the entropy coding reset at a sixth tile boundary of the plurality of tile boundaries of a sixth tile of the plurality of tiles of a picture of the plurality of pictures, when decoding the encoded picture data, if said tile boundary is assigned to the second set of tile boundaries.

Example 75: A video decoder (151) according to one of examples 72 to 74,
wherein each coding tree unit of the plurality of coding tree units of each picture of the plurality of pictures has a position within the picture, wherein the plurality of pictures comprises a current picture and a reference picture, wherein for each coding tree unit of the coding tree units of the current picture, the coding tree unit is correctly aligned, if another coding tree unit among the plurality of coding tree units of the reference picture exists, the position of said another coding tree unit within the reference picture being equal to the position of said coding tree unit within the current picture, wherein for each coding tree unit of the coding tree units of the current picture, the coding tree unit is misaligned, if no other coding tree unit among the plurality of coding tree units of the reference picture exists, having a position within the reference picture being equal to the position of said coding tree unit within the current picture, wherein the current picture is partitioned into the plurality of tiles such that more than half of the coding tree units of the current picture are correctly aligned, and such that less than half of the coding tree units of the current picture are misaligned.

Example 76: A video decoder (151) according to example 75, wherein, for each picture of the one or more subsequent pictures, the picture is partitioned into the plurality of tiles such that all of the coding tree units of the picture are correctly aligned, and such that none of the coding tree units of the picture are misaligned.

Example 77: A video decoder (151) for decoding an encoded video signal comprising encoded picture data to reconstruct a plurality of pictures of a video, wherein the video decoder (151) comprises:

an input interface (160) configured for receiving the encoded video signal, and a data decoder (170) configured for reconstructing the plurality of pictures of the video by decoding the encoded picture data, wherein, for each picture of the plurality of pictures, the picture is partitioned into a plurality of tiles comprising a plurality of coding tree units of the picture, wherein each coding tree unit of the plurality of coding tree units comprises a plurality of samples of the picture and has a position within the picture, wherein the plurality of pictures comprises a current picture and a reference picture, wherein for each coding tree unit of the coding tree units of the current picture, the coding tree unit is correctly aligned, if another coding tree unit among the plurality of coding tree units of the reference picture exists, the position of said another coding tree unit within the reference picture being equal to the position of said coding tree unit within the current picture, wherein for each coding tree unit of the coding tree units of the current picture, the coding tree unit is misaligned, if no other coding tree unit among the plurality of coding tree units of the reference picture exists, having a position within the reference picture being equal to the position of said coding tree unit within the current picture, wherein the plurality of coding tree units of the current picture is arranged within the current picture such that the plurality of coding tree units of the current picture form one or more rows of coding tree units of the current picture, wherein the current picture is partitioned such that there exists no row among the one or more rows of the current picture where any coding tree unit of said row is misaligned, wherein the data decoder (170) is configured to decode the encoded picture data of each of the plurality of tiles of the current picture independently from the encoded picture data of any other tile of the plurality of tiles of the current picture to obtain original picture data of the plurality of coding tree units of the current picture.

Example 78: A video decoder (151) according to example 77, wherein the data decoder (170) is configured to receive the encoded video signal comprising an indication that no row among the one or more rows of the picture exists, where any coding tree unit of said row is misaligned, wherein the data decoder (170) is configured to decode the encoded picture data of each of the plurality of tiles of the current picture depending on the indication independently from the encoded picture data of any other tile of the plurality of tiles of the current picture to obtain original picture data of the plurality of coding tree units of the current picture.

Example 79: A video decoder (151) for decoding an encoded video signal comprising encoded picture data to reconstruct a plurality of pictures of a video, wherein the video decoder (151) comprises:

an input interface (160) configured for receiving the encoded video signal, and a data decoder (170) configured for reconstructing the plurality of pictures of the video by decoding the encoded picture data, wherein, for each picture of the plurality of pictures, the picture is partitioned into a plurality of tiles comprising a plurality of coding tree units of the picture, wherein each coding tree unit of the plurality of coding tree units comprises a plurality of samples of the picture and has a position within the picture, wherein the plurality of pictures comprises a current picture and a reference picture, wherein the reference picture precedes the current picture in time, wherein the data decoder (170) is configured to determine a motion vector of the current picture depending on a motion vector of the reference picture and depending on how the current picture is partitioned into the plurality of tiles of the current picture, and wherein, for each picture of the plurality of pictures, the data decoder (170) is configured to decode, depending on the motion vector of the current picture, the encoded picture data of each of the plurality of tiles of the picture independently from the encoded picture data of any other tile of the plurality of tiles of the picture to obtain original picture data of the plurality of coding tree units of each of the plurality of pictures.

Example 80: A video decoder (151) according to example 79, wherein the data decoder (170) is configured to determine the motion vector of the current picture by selecting a first motion vector predictor at a first location within the reference picture or a second motion vector predictor at a second location within the reference picture depending on a location of the motion vector of the current picture and depending on how the current picture is partitioned.

Example 81: A video decoder (151) according to example 80, wherein for each coding tree unit of the coding tree units of the current picture, the coding tree unit is misaligned, if no other coding tree unit among the plurality of coding tree units of the reference picture exists, having a position within the reference picture being equal to the position of said coding tree unit within the current picture, and wherein at least two coding tree units of the plurality of coding tree units of the current picture are misaligned.

Example 82: A video decoder (151) according to example 79,
> wherein the data decoder (170) is configured to determine a motion vector of the current picture
>> by determining a position of a related block in the reference picture depending on how the current picture is partitioned,
>> by determining a location of a motion vector predictor in the reference picture depending on a location of the motion vector in the current block, and
>> by applying a clipping operation on the location of the motion vector predictor in the reference picture to adapt the location of the motion vector predictor in the reference picture depending on how the current picture is partitioned.

Example 83: A video decoder (151) according to one of examples 68 to 82,
> wherein, for each picture of the plurality of pictures, each coding tree unit of the plurality of coding tree units of the picture is either a partial unit or a full unit, wherein the coding tree unit is the partial unit, if the number of samples of the coding tree unit is smaller than a predefined sample number, and wherein the coding tree unit is the full unit, if the number of samples of the coding tree unit is not smaller than the predefined sample number,
> wherein for each tile of the plurality of tiles of each picture of the plurality of pictures, coding tree units of the tile that are partial units appear only at a bottom border or at a right border of the tile.

Example 84: A video decoder (151) for decoding an encoded video signal comprising encoded picture data to reconstruct a plurality of pictures of a video, wherein the video decoder (151) comprises:
> an input interface (160) configured for receiving the encoded video signal, and
> a data decoder (170) configured for reconstructing the plurality of pictures of the video by decoding the encoded picture data,
> wherein, for each picture of the plurality of pictures, the picture is partitioned into a plurality of tiles comprising a plurality of coding tree units of the picture, wherein each coding tree unit of the plurality of coding tree units comprises a plurality of samples of the picture,
> wherein the encoded video signal further comprises a first flag that indicates for a current picture of the plurality of pictures, whether a reference picture of the plurality of pictures being different from the current picture has been used for encoding the current picture,
> wherein, for a picture of the plurality of pictures, the data decoder (170) is configured to decode the encoded picture data of each of the plurality of tiles of the picture depending on the first flag to obtain original picture data of the plurality of coding tree units of each of the plurality of pictures.

Example 85: A video decoder (151) according to example 84,
> wherein the encoded video signal further comprises a second flag that indicates whether current picture referencing is used, wherein using the current picture referencing comprises copying a reference block of a picture of the plurality of pictures to a current block of said picture, being different from the reference block,
> wherein the data decoder (170) is configured to decode the encoded picture data of each of the plurality of tiles of said picture depending on the second flag.

Example 86: A video decoder (151) according to example 84 or 85,
> wherein the encoded video signal further comprises a syntax element that indicates a number of reference picture lists that are used in prediction,
> wherein the data decoder (170) is configured to decode the encoded picture data of each of the plurality of tiles of said picture depending on the syntax element.

Example 87: A video decoder (151) according to example 86,
> wherein the syntax element that indicates the number of the reference picture lists that are used in prediction is set to a value 0 or to a value 1 or to a value 2, but not to a different value.

Example 88: A video decoder (151) according to example 86,
> wherein the syntax element that indicates the number of the reference picture lists that are used in prediction is set to a value 0 or to a value 1 or to a value 2 or to an integer value being greater than 2.

Example 89: A method for encoding a plurality of pictures of a video by generating an encoded video signal, wherein each of the plurality of pictures comprises original picture data, wherein method comprises:
> generating the encoded video signal comprising encoded picture data, wherein the data encoder is configured to encode the plurality of pictures of the video into the encoded picture data, and
> outputting the encoded picture data of each of the plurality of pictures, wherein the method further comprises:
> for each picture of the plurality of pictures, partitioning the picture into a plurality of tiles comprising a plurality of coding tree units of the picture, wherein each coding tree unit of the plurality of coding tree units comprises a plurality of samples of the picture,
> wherein, for each picture of the plurality of pictures, each coding tree unit of the plurality of coding tree units of the picture is either a partial unit or a full unit, wherein the coding tree unit is the partial unit, if the number of samples of the coding tree unit is smaller than a predefined sample number, and wherein the coding tree unit is the full unit, if the number of samples of the coding tree unit is not smaller than the predefined sample number,
> wherein partitioning each of the plurality of pictures is conducted such that each picture of the plurality of pictures comprises a same first number of partial units among the plurality of coding tree units of the picture,
> wherein, for each picture of the plurality of pictures, encoding the original picture data of each of the plurality of tiles of the picture is conducted independently from the original picture data of any other tile of the plurality of tiles of the picture.

Example 90: A method for decoding an encoded video signal comprising encoded picture data to reconstruct a plurality of pictures of a video, wherein the method comprises:
> receiving the encoded video signal, and reconstructing the plurality of pictures of the video by decoding the encoded picture data, wherein, for each picture of the plurality of pictures, the picture is partitioned into a plurality of tiles comprising a plurality of coding tree units of the picture, wherein each coding tree unit of the plurality of coding tree units comprises a plurality of samples of the picture, wherein, for each picture of the plurality of pictures, each coding tree unit of the plurality of coding tree units of the picture is either a partial unit or a full unit, wherein the coding tree unit is the partial unit, if the number of samples of the coding tree unit is smaller than a predefined sample number, and wherein the coding tree unit is the full unit, if the number of samples of the coding tree unit is not smaller than the predefined sample number, wherein each of the plurality of pictures is partitioned such that each picture of the plurality of pictures comprises a same first number of partial units among the plurality of coding tree units of the picture, wherein, for each picture of the plurality of pictures, decoding the encoded picture data of each of the plurality of tiles of the picture is conducted independently from the encoded picture data of any other tile of the plurality of tiles of the picture.

Example 91: A computer program for implementing the method of example 89 or 90 when being executed on a computer or signal processor.

Example 92: An encoded video signal encoding a picture, wherein the encoded video signal comprises encoded picture data encoding the picture, wherein, for each picture of the plurality of pictures, the picture is partitioned into a plurality of tiles comprising a plurality of coding tree units of the picture, wherein each coding tree unit of the plurality of coding tree units comprises a plurality of samples of the picture, wherein, for each picture of the plurality of pictures, each coding tree unit of the plurality of coding tree units of the picture is either a partial unit or a full unit, wherein the coding tree unit is the partial unit, if the number of samples of the coding tree unit is smaller than a predefined sample number, and wherein the coding tree unit is the full unit, if the number of samples of the coding tree unit is not smaller than the predefined sample number, wherein partitioning each of the plurality of pictures is conducted such that each picture of the plurality of pictures comprises a same first number of partial units among the plurality of coding tree units of the picture, wherein, for each picture of the plurality of pictures, the original picture data of each of the plurality of tiles of the picture is encoded within the encoded video signal independently from the original picture data of any other tile of the plurality of tiles of the picture.

Example 93: A system comprising:
the video encoder (101) according to one of examples 1 to 5, and
the video decoder (151) according to one of examples 45 to 49,
wherein the video encoder (101) configured to generate the encoded video signal, and
wherein the video decoder (151) is configured to decode the encoded video signal to reconstruct the picture of the video.

Example 94: A method for encoding a plurality of pictures of a video by generating an encoded video signal, wherein each of the plurality of pictures comprises original picture data, wherein the method comprises:
generating the encoded video signal comprising encoded picture data, wherein the data encoder is configured to encode the plurality of pictures of the video into the encoded picture data, and
outputting the encoded picture data of each of the plurality of pictures,
wherein, for each picture of the plurality of pictures, a partitioning of the picture defines in a first way, how the picture is partitioned into a plurality of tiles comprising a plurality of coding tree units of the picture, wherein each coding tree unit of the plurality of coding tree units comprises a plurality of samples of the picture,
wherein the method further comprises
for each picture of the plurality of pictures, determine a complexity value depending on a number of samples of each of the plurality of coding tree units of each of the plurality of tiles of the picture,
if the complexity value is greater than a complexity threshold value, adapting the partitioning of the picture and is configured to define in a different, second way, how the picture is partitioned,
wherein, for each picture of the plurality of pictures, encoding, depending on the partitioning of the picture, the original picture data of each of the plurality of tiles of the picture independently from the original picture data of any other tile of the plurality of tiles of the picture.

Example 95: A method for decoding an encoded video signal comprising encoded picture data to reconstruct a plurality of pictures of a video, wherein the method comprises:
receiving the encoded video signal, and
reconstructing the plurality of pictures of the video by decoding the encoded picture data,
for each picture of the plurality of pictures, the picture is partitioned into a plurality of tiles comprising a plurality of coding tree units of the picture, wherein each coding tree unit of the plurality of coding tree units comprises a plurality of samples of the picture,
wherein the method further comprises:
for each picture of the plurality of pictures, determining a complexity value depending on a number of samples of each of the plurality of coding tree units of each of the plurality of tiles of the picture, and
for each picture of the plurality of pictures, decoding depending on the complexity value the encoded picture data of each of the plurality of tiles of the picture independently from the encoded picture data of any other tile of the plurality of tiles of the picture to obtain original picture data of the plurality of coding tree units of each of the plurality of pictures.

Example 96: A computer program for implementing the method of example 94 or 95 when being executed on a computer or signal processor.

Example 97: An encoded video signal encoding a picture, wherein the encoded video signal comprises encoded picture data encoding the picture,
wherein, for each picture of the plurality of pictures, the picture is partitioned into a plurality of tiles comprising a plurality of coding tree units of the picture, wherein each coding tree unit of the plurality of coding tree units comprises a plurality of samples of the picture,
wherein the partitioning of the picture depends on whether a complexity value is greater than a complexity threshold value, wherein the complexity value depends on a number of samples of each of the plurality of coding tree units of each of the plurality of tiles of the picture, wherein, for each picture of the plurality of pictures, original picture data of each of the plurality of tiles of the picture is encoded within the encoded video signal independently from original picture data of any other tile of the plurality of tiles of the picture.

Example 98: A system comprising:
the video encoder (101) according to one of examples 6 to 13, and
the video decoder (151) according to one of examples 50 to 57,
wherein the video encoder (101) configured to generate the encoded video signal, and
wherein the video decoder (151) is configured to decode the encoded video signal to reconstruct the picture of the video.

Example 99: A method for encoding a plurality of pictures of a video by generating an encoded video signal, wherein each of the plurality of pictures comprises original picture data, wherein the method comprises:
generating the encoded video signal comprising encoded picture data, wherein the data encoder is configured to encode the plurality of pictures of the video into the encoded picture data, and
outputting the encoded picture data of each of the plurality of pictures,
wherein, for each picture of the plurality of pictures, the picture is partitioned into a plurality of tiles comprising a plurality of coding tree units of the picture, wherein each coding tree unit of the plurality of coding tree units comprises a plurality of samples of the picture,
wherein, for each picture of the plurality of pictures, each coding tree unit of the plurality of coding tree units of each of the plurality of tiles of the picture, the coding tree unit is either a partial unit or a full unit, wherein the coding tree unit is the partial unit, if the number of samples of the coding tree unit is smaller than a predefined sample number, and wherein the coding tree unit is the full unit, if the number of samples of the coding tree unit is not smaller than the predefined sample number,
wherein the method further comprises:
for each picture of the plurality of pictures, encoding the original picture data of each of the plurality of tiles of the picture independently from the original picture data of any other tile of the plurality of tiles of the picture,
wherein generating the encoded video signal is conducted such that the encoded video signal further comprises indication data providing information on a number of the coding tree units that are partial units among the plurality of coding tree units of a tile of the plurality of tiles of a picture of the plurality of pictures.

Example 100: A method for decoding an encoded video signal comprising encoded picture data to reconstruct a plurality of pictures of a video, wherein the method comprises:
receiving the encoded video signal, and
reconstructing the plurality of pictures of the video by decoding the encoded picture data,
wherein, for each picture of the plurality of pictures, the picture is partitioned into a plurality of tiles comprising a plurality of coding tree units of the picture, wherein each coding tree unit of the plurality of coding tree units comprises a plurality of samples of the picture,
wherein, for each picture of the plurality of pictures, each coding tree unit of the plurality of coding tree units of each of the plurality of tiles of the picture, the coding tree unit is either a partial unit or a full unit, wherein the coding tree unit is the partial unit, if the number of samples of the coding tree unit is smaller than a predefined sample number, and wherein the coding tree unit is the full unit, if the number of samples of the coding tree unit is not smaller than the predefined sample number,
wherein the encoded video signal further comprises indication data providing information on a number of the coding tree units that are partial units among the plurality of coding tree units of a tile of the plurality of tiles of a picture of the plurality of pictures,
wherein the method further comprises:
for each picture of the plurality of pictures, decoding depending on the indication data the encoded picture data of each of the plurality of tiles of the picture independently from the encoded picture data of any other tile of the plurality of tiles of the picture to obtain original picture data of the plurality of coding tree units of each of the plurality of pictures.

Example 101: A computer program for implementing the method of example 99 or 100 when being executed on a computer or signal processor.

Example 102: An encoded video signal encoding a picture, wherein the encoded video signal comprises encoded picture data encoding the picture,
wherein, for each picture of the plurality of pictures, the picture is partitioned into a plurality of tiles comprising a plurality of coding tree units of the picture, wherein each coding tree unit of the plurality of coding tree units comprises a plurality of samples of the picture,
wherein, for each picture of the plurality of pictures, each coding tree unit of the plurality of coding tree units of each of the plurality of tiles of the picture, the coding tree unit is either a partial unit or a full unit, wherein the coding tree unit is the partial unit, if the number of samples of the coding tree unit is smaller than a predefined sample number, and wherein the coding tree unit is the full unit, if the number of samples of the coding tree unit is not smaller than the predefined sample number,
wherein, for each picture of the plurality of pictures, the original picture data of each of the plurality of tiles of the picture is encoded independently from the original picture data of any other tile of the plurality of tiles of the picture within the encoded video signal,
wherein the encoded video signal further comprises indication data providing information on a number of the coding tree units that are partial units among the plurality of coding tree units of a tile of the plurality of tiles of a picture of the plurality of pictures.

Example 103: A system comprising:
the video encoder (101) according to one of examples 14 to 18, and
the video decoder (151) according to one of examples 58 to 62,
wherein the video encoder (101) configured to generate the encoded video signal, and
wherein the video decoder (151) is configured to decode the encoded video signal to reconstruct the picture of the video.

Example 104: A method for encoding a plurality of pictures of a video by generating an encoded video signal, wherein each of the plurality of pictures comprises original picture data, wherein the method comprises:

generating the encoded video signal comprising encoded picture data, wherein the data encoder is configured to encode the plurality of pictures of the video into the encoded picture data, and outputting the encoded picture data of each of the plurality of pictures, wherein the method further comprises:

for each picture of the plurality of pictures, partitioning the picture into a plurality of tiles comprising a plurality of coding tree units of the picture, wherein each coding tree unit of the plurality of coding tree units comprises a plurality of samples of the picture, wherein for each coding tree unit of the plurality of coding tree units of each of the plurality of tiles of the picture, the coding tree unit is either a partial unit or a full unit, wherein the coding tree unit is the partial unit, if the number of samples of the coding tree unit is smaller than a predefined sample number, and wherein the coding tree unit is the full unit, if the number of samples of the coding tree unit is not smaller than the predefined sample number, wherein for at least two pictures of the plurality of pictures, partitioning the picture is conducted such that the at least two pictures have a same partial-to-full-unit ratio, wherein the partial-to-full-unit ratio defines for a picture of the plurality of pictures a ratio of a number of the coding tree units of the picture that are partial units to a number of the coding tree units of the picture that are full units, wherein, for each picture of the plurality of pictures, the original picture data of each of the plurality of tiles of the picture is encoded independently from the original picture data of any other tile of the plurality of tiles of the picture.

Example 105: A method for decoding an encoded video signal comprising encoded picture data to reconstruct a plurality of pictures of a video, wherein method comprises:

receiving the encoded video signal, and reconstructing the plurality of pictures of the video by decoding the encoded picture data, wherein, for each picture of the plurality of pictures, the picture is partitioned into a plurality of tiles comprising a plurality of coding tree units of the picture, wherein each coding tree unit of the plurality of coding tree units comprises a plurality of samples of the picture, wherein for each coding tree unit of the plurality of coding tree units of each of the plurality of tiles of the picture, the coding tree unit is either a partial unit or a full unit, wherein the coding tree unit is the partial unit, if the number of samples of the coding tree unit is smaller than a predefined sample number, and wherein the coding tree unit is the full unit, if the number of samples of the coding tree unit is not smaller than the predefined sample number, wherein for at least two pictures of the plurality of pictures, the picture is partitioned such that the at least two pictures have a same partial-to-full-unit ratio, wherein the partial-to-full-unit ratio defines for a picture of the plurality of pictures a ratio of a number of the coding tree units of the picture that are partial units to a number of the coding tree units of the picture that are full units, wherein, for each picture of the plurality of pictures, decoding the encoded picture data of each of the plurality of tiles of the picture is conducted independently from the encoded picture data of any other tile of the plurality of tiles of the picture to obtain original picture data of the plurality of coding tree units of each of the plurality of pictures.

Example 106: A computer program for implementing the method of example 104 or 105 when being executed on a computer or signal processor.

Example 107: An encoded video signal encoding a picture, wherein the encoded video signal comprises encoded picture data encoding the picture, wherein, for each picture of the plurality of pictures, the picture is partitioned into a plurality of tiles comprising a plurality of coding tree units of the picture, wherein each coding tree unit of the plurality of coding tree units comprises a plurality of samples of the picture, wherein for each coding tree unit of the plurality of coding tree units of each of the plurality of tiles of the picture, the coding tree unit is either a partial unit or a full unit, wherein the coding tree unit is the partial unit, if the number of samples of the coding tree unit is smaller than a predefined sample number, and wherein the coding tree unit is the full unit, if the number of samples of the coding tree unit is not smaller than the predefined sample number, wherein for at least two pictures of the plurality of pictures, the picture is partitioned such that the at least two pictures have a same partial-to-full-unit ratio, wherein the partial-to-full-unit ratio defines for a picture of the plurality of pictures a ratio of a number of the coding tree units of the picture that are partial units to a number of the coding tree units of the picture that are full units, wherein, for each picture of the plurality of pictures, the original picture data of each of the plurality of tiles of the picture is encoded within the encoded video signal independently from the original picture data of any other tile of the plurality of tiles of the picture.

Example 108: A system comprising:

the video encoder (101) according to one of examples 19 to 22, and the video decoder (151) according to one of examples 63 to 66, wherein the video encoder (101) configured to generate the encoded video signal, and wherein the video decoder (151) is configured to decode the encoded video signal to reconstruct the picture of the video.

Example 109: A method for encoding a plurality of pictures of a video by generating an encoded video signal, wherein each of the plurality of pictures comprises original picture data, wherein the method comprises:

generating the encoded video signal comprising encoded picture data, wherein the data encoder is configured to encode the plurality of pictures of the video into the encoded picture data, and outputting the encoded picture data of each of the plurality of pictures, wherein the method further comprises:

for each picture of the plurality of pictures, partitioning the picture into a plurality of tiles comprising a plurality of coding tree units of the picture, wherein each coding tree unit of the plurality of coding tree units comprises a plurality of samples of the picture and has a position within the picture, wherein the plurality of pictures comprises a current picture and a reference picture, wherein for each coding tree unit of the coding tree units of the current picture, the coding tree unit is correctly aligned, if another coding tree unit among the plurality of coding tree units of the reference picture exists, the position of said another coding tree unit within the reference picture being equal to the position of said coding tree unit within the current picture, wherein for each coding tree unit of the coding tree units of the current picture, the coding tree unit is misaligned, if no other coding tree unit among the plurality of coding tree units of the reference picture exists, having a position within the reference picture being equal to the position of said coding tree unit within the current picture, wherein partitioning the current picture into the plurality of tiles is conducted such that a ratio between the coding tree units of the current picture being misaligned to the coding tree units of the current picture being correctly aligned is not greater than a threshold value, wherein, for each picture of the plurality of pictures, the original picture data of each of the plurality of tiles of the picture is encoded independently from the original picture data of any other tile of the plurality of tiles of the picture.

Example 110: A method for decoding an encoded video signal comprising encoded picture data to reconstruct a plurality of pictures of a video, wherein the method comprises:

receiving the encoded video signal, and reconstructing the plurality of pictures of the video by decoding the encoded picture data, wherein, for each picture of the plurality of pictures, the picture is partitioned into a plurality of tiles comprising a plurality of coding tree units of the picture, wherein each coding tree unit of the plurality of coding tree units comprises a plurality of samples of the picture and has a position within the picture, wherein the plurality of pictures comprises a current picture and a reference picture, wherein for each coding tree unit of the coding tree units of the current picture, the coding tree unit is correctly aligned, if another coding tree unit among the plurality of coding tree units of the reference picture exists, the position of said another coding tree unit within the reference picture being equal to the position of said coding tree unit within the current picture, wherein for each coding tree unit of the coding tree units of the current picture, the coding tree unit is misaligned, if no other coding tree unit among the plurality of coding tree units of the reference picture exists, having a position within the reference picture being equal to the position of said coding tree unit within the current picture, wherein the current picture is partitioned into the plurality of tiles such that a ratio between the coding tree units of the current picture being misaligned to the coding tree units of the current picture being correctly aligned is not greater than a threshold value, wherein, for each picture of the plurality of pictures, the encoded picture data of each of the plurality of tiles of the picture is decoded independently from the encoded picture data of any other tile of the plurality of tiles of the picture to obtain original picture data of the plurality of coding tree units of each of the plurality of pictures.

Example 111: A computer program for implementing the method of example 109 or 110 when being executed on a computer or signal processor.

Example 112: An encoded video signal encoding a picture, wherein the encoded video signal comprises encoded picture data encoding the picture, wherein, for each picture of the plurality of pictures, the picture is partitioned into a plurality of tiles comprising a plurality of coding tree units of the picture, wherein each coding tree unit of the plurality of coding tree units comprises a plurality of samples of the picture and has a position within the picture, wherein the plurality of pictures comprises a current picture and a reference picture, wherein for each coding tree unit of the coding tree units of the current picture, the coding tree unit is correctly aligned, if another coding tree unit among the plurality of coding tree units of the reference picture exists, the position of said another coding tree unit within the reference picture being equal to the position of said coding tree unit within the current picture, wherein for each coding tree unit of the coding tree units of the current picture, the coding tree unit is misaligned, if no other coding tree unit among the plurality of coding tree units of the reference picture exists, having a position within the reference picture being equal to the position of said coding tree unit within the current picture, wherein the current picture is partitioned into the plurality of tiles is conducted such that a ratio between the coding tree units of the current picture being misaligned to the coding tree units of the current picture being correctly aligned is not greater than a threshold value, wherein, for each picture of the plurality of pictures, the original picture data of each of the plurality of tiles of the picture is encoded within the encoded video signal independently from the original picture data of any other tile of the plurality of tiles of the picture.

Example 113: A system comprising:

the video encoder (101) according to one of examples 24 to 27, and the video decoder (151) according to one of examples 68 to 71, wherein the video encoder (101) configured to generate the encoded video signal, and wherein the video decoder (151) is configured to decode the encoded video signal to reconstruct the picture of the video.

Example 114: A method for encoding a plurality of pictures of a video by generating an encoded video signal, wherein each of the plurality of pictures comprises original picture data, wherein method comprises:

generating the encoded video signal comprising encoded picture data, wherein the data encoder is configured to encode the plurality of pictures of the video into the encoded picture data, and outputting the encoded picture data of each of the plurality of pictures, wherein the method further comprises:

for each picture of the plurality of pictures, partitioning the picture into a plurality of tiles comprising a plurality of coding tree units of the picture by defining a plurality of tile boundaries for each tile of the plurality of tiles, wherein each coding tree unit of the plurality of coding tree units of each picture of the plurality of pictures comprises a plurality of samples of the picture, for each picture of the plurality of pictures, encoding, depending on the plurality of tile boundaries of each tile of the plurality of tiles of the picture, the original picture data of said tile independently from the original picture data of any other tile of the plurality of tiles of the picture, wherein each tile boundary of the plurality of tile boundaries of each of the plurality of tiles of each of the plurality of pictures is either assigned to a first set of tile boundaries or is assigned to a second set of tile boundaries, wherein encoding the original picture data comprises changing an encoding scan order at a first tile boundary of the plurality of tile boundaries of a first tile of the plurality of tiles of a picture of the plurality of pictures, when encoding the original picture data, if said tile boundary is assigned to the first set of tile boundaries, and wherein encoding the original picture data comprises not changing the encoding scan order at a second tile boundary of the plurality of tile boundaries of a second tile of the plurality of tiles of a picture of the plurality of pictures, when encoding the original picture data, if said tile boundary is assigned to the second set of tile boundaries.

Example 115: A method for decoding an encoded video signal comprising encoded picture data to reconstruct a plurality of pictures of a video, wherein the method comprises:

receiving the encoded video signal, and reconstructing the plurality of pictures of the video by decoding the encoded picture data, wherein, for each picture of the plurality of pictures, the picture is partitioned into a plurality of tiles comprising a plurality of coding tree units of the picture by defining a plurality of tile boundaries for each tile of the plurality of tiles, wherein each coding tree unit of the plurality of coding tree units of each picture of the plurality of pictures comprises a plurality of samples of the picture, wherein the method further comprises:

for each picture of the plurality of pictures, decoding, depending on the plurality of tile boundaries of each tile of the plurality of tiles of the picture, the encoded picture data of said tile independently from the encoded picture data of any other tile of the plurality of tiles of the picture to obtain original picture data of the plurality of coding tree units of each of the plurality of pictures, wherein each tile boundary of the plurality of tile boundaries of each of the plurality of tiles of each of the plurality of pictures is either assigned to a first set of tile boundaries or is assigned to a second set of tile boundaries, wherein decoding the encoded picture data comprises changing a decoding scan order at a first tile boundary of the plurality of tile boundaries of a first tile of the plurality of tiles of a picture of the plurality of pictures, when decoding the encoded picture data, if said tile boundary is assigned to the first set of tile boundaries, and wherein decoding the encoded picture data comprises not changing the decoding scan order at a second tile boundary of the plurality of tile boundaries of a second tile of the plurality of tiles of a picture of the plurality of pictures, when decoding the encoded picture data, if said tile boundary is assigned to the second set of tile boundaries.

Example 116: A computer program for implementing the method of example 114 or 115 when being executed on a computer or signal processor.

Example 117: An encoded video signal encoding a picture, wherein the encoded video signal comprises encoded picture data encoding the picture, wherein, for each picture of the plurality of pictures, the picture is partitioned into a plurality of tiles comprising a plurality of coding tree units of the picture by defining a plurality of tile boundaries for each tile of the plurality of tiles, wherein each coding tree unit of the plurality of coding tree units of each picture of the plurality of pictures comprises a plurality of samples of the picture, wherein, for each picture of the plurality of pictures, the original picture data of each tile of the plurality of tiles of the picture is encoded within the encoded video signal, depending on the plurality of tile boundaries of said tile, independently from the original picture data of any other tile of the plurality of tiles of the picture, wherein each tile boundary of the plurality of tile boundaries of each of the plurality of tiles of each of the plurality of pictures is either assigned to a first set of tile boundaries or is assigned to a second set of tile boundaries, wherein the original picture data is encoded depending on that a change of an encoding scan order has been conducted at a first tile boundary of the plurality of tile boundaries of a first tile of the plurality of tiles of a picture of the plurality of pictures, when the original picture data has been encoded, if said tile boundary is assigned to the first set of tile boundaries, and wherein the original picture data is encoded depending on that a change of the encoding scan order has not been conducted at a second tile boundary of the plurality of tile boundaries of a second tile of the plurality of tiles of a picture of the plurality of pictures, when the original picture data has been encoded, if said tile boundary is assigned to the second set of tile boundaries.

Example 118: A system comprising:

the video encoder (101) according to one of examples 28 to 32, and the video decoder (151) according to one of examples 72 to 76, wherein the video encoder (101) configured to generate the encoded video signal, and wherein the video decoder (151) is configured to decode the encoded video signal to reconstruct the picture of the video.

Example 119: A method for encoding a plurality of pictures of a video by generating an encoded video signal, wherein each of the plurality of pictures comprises original picture data, wherein the method comprises:

generating the encoded video signal comprising encoded picture data, wherein the data encoder is configured to encode the plurality of pictures of the video into the encoded picture data, and outputting the encoded picture data of each of the plurality of pictures, wherein the method further comprises:

for each picture of the plurality of pictures, partitioning the picture into a plurality of tiles comprising a plurality of coding tree units of the picture, wherein each coding tree unit of the plurality of coding tree units comprises a plurality of samples of the picture and has a position within the picture, wherein the plurality of pictures comprises a current picture and a reference picture, wherein for each coding tree unit of the coding tree units of the current picture, the coding tree unit is correctly aligned, if another coding tree unit among the plurality of coding tree units of the reference picture exists, the position of said another coding tree unit within the reference picture being equal to the position of said coding tree unit within the current picture, wherein for each coding tree unit of the coding tree units of the current picture, the coding tree unit is misaligned, if no other coding tree unit among the plurality of coding tree units of the reference picture exists, having a position within the reference picture being equal to the position of said coding tree unit within the current picture, wherein the plurality of coding tree units of the current picture is arranged within the current picture such that the plurality of coding tree units of the current picture form one or more rows of coding tree units of the current picture, wherein partitioning the current picture is conducted such that there exists no row among the one or more rows of the picture where any coding tree unit of said row is misaligned, wherein encoding the original picture data of each of the plurality of tiles of the current picture is conducted independently from the original picture data of any other tile of the current picture.

Example 120: A method for decoding an encoded video signal comprising encoded picture data to reconstruct a plurality of pictures of a video, wherein the method comprises:

receiving the encoded video signal, and reconstructing the plurality of pictures of the video by decoding the encoded picture data, wherein, for each picture of the plurality of pictures, the picture is partitioned into a plurality of tiles comprising a plurality of coding tree units of the picture, wherein each coding tree unit of the plurality of coding tree units comprises a plurality of samples of the picture and has a position within the picture, wherein the plurality of pictures comprises a current picture and a reference picture, wherein for each coding tree unit of the coding tree units of the current picture, the coding tree unit is correctly aligned, if another coding tree unit among the plurality of coding tree units of the reference picture exists, the position of said another coding tree unit within the reference picture being equal to the position of said coding tree unit within the current picture, wherein for each coding tree unit of the coding tree units of the current picture, the coding tree unit is misaligned, if no other coding tree unit among the plurality of coding tree units of the reference picture exists, having a position within the reference picture being equal to the position of said coding tree unit within the current picture, wherein the plurality of coding tree units of the current picture is arranged within the current picture such that the plurality of coding tree units of the current picture form one or more rows of coding tree units of the current picture, wherein the data encoder (110) is configured to partition the current picture such that there exists no row among the one or more rows of the current picture where any coding tree unit of said row is misaligned, wherein the data encoder (110) is configured to encode the original picture data of each of the plurality of tiles of the current picture independently from the original picture data of any other tile of the plurality of tiles of the current picture, wherein the current picture is partitioned such that there exists no row among the one or more rows of the current picture where any coding tree unit of said row is misaligned, wherein decoding the encoded picture data of each of the plurality of tiles of the current picture is conducted independently from the encoded picture data of any other tile of the plurality of tiles of the current picture to obtain original picture data of the current picture.

Example 121: A computer program for implementing the method of example 119 or 120 when being executed on a computer or signal processor.

Example 122: An encoded video signal encoding a picture, wherein the encoded video signal comprises encoded picture data encoding the picture, wherein, for each picture of the plurality of pictures, the picture is partitioned into a plurality of tiles comprising a plurality of coding tree units of the picture, wherein each coding tree unit of the plurality of coding tree units comprises a plurality of samples of the picture and has a position within the picture, wherein the plurality of pictures comprises a current picture and a reference picture, wherein for each coding tree unit of the coding tree units of the current picture, the coding tree unit is correctly aligned, if another coding tree unit among the plurality of coding tree units of the reference picture exists, the position of said another coding tree unit within the reference picture being equal to the position of said coding tree unit within the current picture, wherein for each coding tree unit of the coding tree units of the current picture, the coding tree unit is misaligned, if no other coding tree unit among the plurality of coding tree units of the reference picture exists, having a position within the reference picture being equal to the position of said coding tree unit within the current picture, wherein the plurality of coding tree units of the current picture is arranged within the current picture such that the plurality of coding tree units of the current picture form one or more rows of coding tree units of the current picture, wherein the data encoder (110) is configured to partition the current picture such that there exists no row among the one or more rows of the current picture where any coding tree unit of said row is misaligned, wherein the data encoder (110) is configured to encode the original picture data of each of the plurality of tiles of the current picture independently from the original picture data of any other tile of the plurality of tiles of the current picture, wherein the current picture is partitioned such that there exists no row among the one or more rows of the current picture where any coding tree unit of said row is misaligned, wherein the original picture data of each of the plurality of tiles of the current picture is encoded within the encoded video signal independently from the original picture data of any other tile of the plurality of tiles of the current picture.

Example 123: A system comprising:
the video encoder (101) according to example 33 or 34, and
the video decoder (151) according to example 77 or 78,
wherein the video encoder (101) configured to generate the encoded video signal, and
wherein the video decoder (151) is configured to decode the encoded video signal to reconstruct the picture of the video.

Example 124: A method for encoding a plurality of pictures of a video by generating an encoded video signal, wherein each of the plurality of pictures comprises original picture data, wherein the method comprises:
generating the encoded video signal comprising encoded picture data, wherein the data encoder is configured to encode the plurality of pictures of the video into the encoded picture data, and
outputting the encoded picture data of each of the plurality of pictures,
wherein the method further comprises:
for each picture of the plurality of pictures, partitioning the picture into a plurality of tiles comprising a plurality of coding tree units of the picture, wherein each coding tree unit of the plurality of coding tree units comprises a plurality of samples of the picture and has a position within the picture,
wherein the plurality of pictures comprises a current picture and a reference picture, wherein the reference picture precedes the current picture in time,
determining a motion vector of the current picture depending on a motion vector of the reference picture and depending on how the current picture is partitioned into the plurality of tiles of the current picture, and
encoding, depending on the motion vector of the current picture, the original picture data of each of the plurality of tiles of the current picture independently from the original picture data of any other tile of the plurality of tiles of the picture.

Example 125: A method for decoding an encoded video signal comprising encoded picture data to reconstruct a plurality of pictures of a video, wherein method comprises:
receiving the encoded video signal, and
reconstructing the plurality of pictures of the video by decoding the encoded picture data,
wherein, for each picture of the plurality of pictures, the picture is partitioned into a plurality of tiles comprising a plurality of coding tree units of the picture, wherein each coding tree unit of the plurality of coding tree units comprises a plurality of samples of the picture and has a position within the picture,
wherein the plurality of pictures comprises a current picture and a reference picture, wherein the reference picture precedes the current picture in time,
wherein the method further comprises:
determining a motion vector of the current picture depending on a motion vector of the reference picture and depending on how the current picture is partitioned into the plurality of tiles of the current picture, and
for each picture of the plurality of pictures, decoding, depending on the motion vector of the current picture, the encoded picture data of each of the plurality of tiles of the picture independently from the encoded picture data of any other tile of the plurality of tiles of the picture to obtain original picture data of the plurality of coding tree units of each of the plurality of pictures.

Example 126: A computer program for implementing the method of example 124 or 125 when being executed on a computer or signal processor.

Example 127: An encoded video signal encoding a picture, wherein the encoded video signal comprises encoded picture data encoding the picture,
wherein, for each picture of the plurality of pictures, the picture is partitioned into a plurality of tiles comprising a plurality of coding tree units of the picture, wherein each coding tree unit of the plurality of coding tree units comprises a plurality of samples of the picture and has a position within the picture, wherein the plurality of pictures comprises a current picture and a reference picture, wherein the reference picture precedes the current picture in time,
wherein a motion vector of the current picture depends on a motion vector of the reference picture and depends on how the current picture is partitioned into the plurality of tiles of the current picture, and
wherein the original picture data of each of the plurality of tiles of the current picture is encoded within the encoded video signal depending on the motion vector of the current picture, encoded independently from the original picture data of any other tile of the plurality of tiles of the picture.

Example 128: A system comprising:
the video encoder (101) according to one of examples 35 to 38, and
the video decoder (151) according to one of examples 79 to 82,
wherein the video encoder (101) configured to generate the encoded video signal, and
wherein the video decoder (151) is configured to decode the encoded video signal to reconstruct the picture of the video.

Example 129: A method for encoding a plurality of pictures of a video by generating an encoded video signal, wherein each of the plurality of pictures comprises original picture data, wherein the method comprises:
generating the encoded video signal comprising encoded picture data, wherein the data encoder is configured to encode the plurality of pictures of the video into the encoded picture data, and
outputting the encoded picture data of each of the plurality of pictures,
wherein the method further comprises:
for each picture of the plurality of pictures, partitioning the picture into a plurality of tiles comprising a plurality of coding tree units of the picture, wherein each coding tree unit of the plurality of coding tree units comprises a plurality of samples of the picture,
for each picture of the plurality of pictures, encoding the original picture data of each of the plurality of tiles of the picture, and
wherein generating the encoded video signal is conducted such that the encoded video signal further comprises a first flag that indicates for a current picture of the plurality of pictures, whether a reference picture of the plurality of pictures being different from the current picture has been used for encoding the current picture.

Example 130: A method for decoding an encoded video signal comprising encoded picture data to reconstruct a plurality of pictures of a video, wherein the method comprises:

receiving the encoded video signal, and reconstructing the plurality of pictures of the video by decoding the encoded picture data, wherein, for each picture of the plurality of pictures, the picture is partitioned into a plurality of tiles comprising a plurality of coding tree units of the picture, wherein each coding tree unit of the plurality of coding tree units comprises a plurality of samples of the picture, wherein the encoded video signal further comprises a first flag that indicates for a current picture of the plurality of pictures, whether a reference picture of the plurality of pictures being different from the current picture has been used for encoding the current picture, wherein, for a picture of the plurality of pictures, decoding the encoded picture data of each of the plurality of tiles of the picture is conducted depending on the first flag to obtain original picture data of the plurality of coding tree units of each of the plurality of pictures.

Example 131: A computer program for implementing the method of example 129 or 130 when being executed on a computer or signal processor.

Example 132: An encoded video signal encoding a picture, wherein the encoded video signal comprises encoded picture data encoding the picture, wherein, for each picture of the plurality of pictures, the picture is partitioned into a plurality of tiles comprising a plurality of coding tree units of the picture, wherein each coding tree unit of the plurality of coding tree units comprises a plurality of samples of the picture, wherein, for each picture of the plurality of pictures, the original picture data of each of the plurality of tiles of the picture is encoded within the encoded video signal, and wherein the encoded video signal further comprises a first flag that indicates for a current picture of the plurality of pictures, whether a reference picture of the plurality of pictures being different from the current picture has been used for encoding the current picture.

Example 133: A system comprising:

the video encoder (101) according to one of examples 40 to 44, and the video decoder (151) according to one of examples 84 to 88, wherein the video encoder (101) configured to generate the encoded video signal, and wherein the video decoder (151) is configured to decode the encoded video signal to reconstruct the picture of the video.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] ISO/IEC, ITU-T. High efficiency video coding. ITU-T Recommendation H.265|ISO/IEC 23008 10 (HEVC), edition 1, 2013; edition 2, 2014.

The invention claimed is:

1. A video encoder comprising at least one processor and memory, the memory comprising instructions which, when executed by the at least one processor cause the video encoder:
  encode a first flag for a segment of a current picture into a data stream, wherein the first flag equal to one indicates that blocks of the segment are intra-predicted only, meaning that the blocks of the segment are predicted based on reconstructed samples of the current picture only;
  determine to encode a second flag into the data stream based on the first flag being equal to one;
  encode the second flag into the data stream that indicates whether or not a current block of the segment is encoded using intra block copy (IBC), wherein when the current block is encoded using IBC, the current block is predicted by copying samples from a reference block of reconstructed samples of the current picture;
  based on the second flag indicating that the current block is encoded using IBC, determine a prediction of the current block by copying samples from the reference block of reconstructed samples of the current picture; and
  encode a prediction residual into the data stream based on the prediction of the current block.

2. A video decoder comprising at least one processor and memory, the memory comprising instructions which, when executed by the at least one processor, cause the video decoder to:
  decode a first flag for a segment of a current picture from a data stream, the segment encoded into the data stream, wherein the first flag equal to one indicates that blocks of the segment are intra-predicted only, meaning that the blocks of the segment are predicted based on reconstructed samples of the current picture only;
  determine to decode a second flag from the data stream based on the first flag being equal to one;
  decode the second flag from the data stream that indicates whether or not a current block of the segment is encoded using intra block copy (IBC), wherein when the current block is encoded using IBC, the current block is predicted by copying samples from a reference block of reconstructed samples of the current picture;
  based on the second flag indicating that the current block is encoded using IBC, determine a prediction of the current block by copying samples from the reference block of reconstructed samples of the current picture; and
  reconstruct the current block based on the prediction of the current block and a prediction residual decoded from the data stream.

3. A method of video encoding, the method comprising:
  encoding a first flag for a segment of a current picture into a data stream, wherein the first flag equal to one indicates that blocks of the segment are intra-predicted only, meaning that the blocks of the segment are predicted based on reconstructed samples of the current picture only;
  determining to encode a second flag into the data stream based the first flag being equal to one;
  encoding the second flag into the data stream that indicates whether or not a current block of the segment is encoded using intra block copy (IBC), wherein when the current block is encoded using IBC, the current block is predicted by copying samples from a reference block of reconstructed samples of the current picture;
  based on the second flag indicating that the current block is encoded using IBC, determining a prediction of the current block by copying samples from the reference block of reconstructed samples of the current picture; and
  encoding a prediction residual into the data stream based on the prediction of the current block.

4. A method of video decoding, the method comprising:
  decoding a first flag for a segment of a current picture from a data stream, the segment encoded into the data stream, wherein the first flag equal to one indicates that blocks of the segment are intra-predicted only, meaning that the blocks of the segment are predicted based on reconstructed samples of the current picture only;
  decoding the second flag from the data stream that indicates whether or not a current block of the segment is encoded using intra block copy (IBC), wherein when the current block is encoded using IBC, the current block is predicted by copying samples from a reference block of reconstructed samples of the current picture;
  based on the second flag indicating that the current block is encoded using IBC, determine a prediction of the current block by copying samples from the reference block of reconstructed samples of the current picture; and
  reconstructing the current block based on the prediction of the current block and a prediction decoded from the data stream.

5. A non-transitory digital storage medium having a computer program stored thereon to perform, when the computer program is run by a computer, the steps of:
  decoding a first flag for a segment of a current picture from a data stream, wherein the first flag equal to one indicates that block of the segment are intra-predicted only, meaning that the blocks of the segment are predicted based on reconstructed samples of the current picture only;
  determining to decode a second flag from the data stream base don the first flag being equal to one;
    decoding a second flag from the data stream that indicates whether or not a current block of the segment is encoded using intra block copy (IBC), wherein when the current block is encoded with IBC, the current block is predicted by copying samples from a reference block of reconstructed samples of the current picture;
    based on the second flag indicating that the current block is encoded using IBC, determine a prediction of the current block by copying samples from the reference block of reconstructed samples of the current picture; and reconstructing the current block based on the prediction of the current block and a prediction residual decoded from the data stream.

6. A non-transitory digital storage medium having a computer program stored thereon to perform, when the computer program is run by a computer, the steps of:
  encoding a first flag for a segment of a current picture into a data stream, wherein the first flag equal to one indicates that blocks of the cold segment are intra-predicted only, meaning that the blocks of the segment are predicted based on reconstructed samples of the current picture only;
  determining to encode a second flag into the data stream based on the first flag not being equal to zero;
  encoding the second flag into the data stream that indicates whether or not a current block of the segment is encoded using intra block copy (IBC), wherein when the current block is encoded using IBC, the current block is predicted by copying samples from a reference block of the current picture;
  based on the second flag indicating that the current block is encoded using IBC, determining a prediction of the current block by copying samples from the reference block of current picture; and
  encoding a prediction residual into the data stream based on the prediction of the current block.

\* \* \* \* \*

UNITED STATES PATENT AND TRADEMARK OFFICE
CERTIFICATE OF CORRECTION

| | |
|---|---|
| PATENT NO. | : 11,758,132 B2 |
| APPLICATION NO. | : 16/777180 |
| DATED | : September 12, 2023 |
| INVENTOR(S) | : Robert Philipp Skupin |

It is certified that error appears in the above-identified patent and that said Letters Patent is hereby corrected as shown below:

On the Title Page

Item (30) – Foreign Application Priority Data – should read:
Dec. 28, 2018 (EP) 18248303

In the Claims

Column 54, Claim 4, between Lines 30 and 31, insert --determining to decode a second flag from the data stream based on the first flag being equal to one;--

Signed and Sealed this
Twenty-seventh Day of February, 2024

*Katherine Kelly Vidal*

Katherine Kelly Vidal
*Director of the United States Patent and Trademark Office*